(12) United States Patent
Xiao et al.

(10) Patent No.: US 9,332,443 B2
(45) Date of Patent: May 3, 2016

(54) METHOD AND APPARATUS FOR POSITIONING USER EQUIPMENT

(71) Applicant: Huawei Technologies Co., Ltd., Shenzhen (CN)

(72) Inventors: Dengkun Xiao, Beijing (CN); Jie Cui, Beijing (CN); Anjian Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 193 days.

(21) Appl. No.: 14/187,898

(22) Filed: Feb. 24, 2014

(65) Prior Publication Data

US 2014/0171111 A1    Jun. 19, 2014

Related U.S. Application Data

(63) Continuation of application No. PCT/CN2012/080561, filed on Aug. 24, 2012.

(30) Foreign Application Priority Data

Aug. 24, 2011    (CN) .......................... 2011 1 0248280

(51) Int. Cl.
| | |
|---|---|
| *H04W 24/00* | (2009.01) |
| *H04W 64/00* | (2009.01) |
| *G01S 1/02* | (2010.01) |
| *G01S 1/24* | (2006.01) |

(52) U.S. Cl.
CPC ............. *H04W 24/00* (2013.01); *G01S 1/02* (2013.01); *G01S 1/24* (2013.01); *H04W 64/00* (2013.01)

(58) Field of Classification Search
CPC ................................ H04W 64/00; H04W 4/02

USPC ................................ 455/456.1, 456.5, 456.6
See application file for complete search history.

(56) References Cited

U.S. PATENT DOCUMENTS

| | | | |
|---|---|---|---|
| 6,681,099 B1 | 1/2004 | Keranen et al. | |
| 7,734,249 B1 | 6/2010 | Mitchell et al. | |

(Continued)

FOREIGN PATENT DOCUMENTS

| | | | |
|---|---|---|---|
| CN | 1612638 A | 12/1912 | |
| CN | 1444833 A | 9/2003 | |

(Continued)

OTHER PUBLICATIONS

Samsung Electronics Research Institute (UK), "Regarding the effect of Repeaters on positioning accuracy," TSG-RAN Working Group 2 meeting #21, TSGR2#011372, May 21-25, 2001, 5 pages.

(Continued)

*Primary Examiner* — Temica M Beamer
(74) *Attorney, Agent, or Firm* — Slater & Matsil, L.L.P.

(57) ABSTRACT

Embodiments of the present invention disclose a method and an apparatus for positioning a user equipment. The method includes receiving positioning measurement information sent by a base station. The positioning configuration information includes a sum of a difference between receiving time and sending time on the UE and a difference between receiving time and sending time on the base station. A round trip time between the intermediate node that sends the CRS and the UE is calculated according to the positing in formation. A position of the UE is determined using position coordinates of the intermediate node that sends the CRS and the round trip time.

21 Claims, 11 Drawing Sheets

(56) References Cited

U.S. PATENT DOCUMENTS

| | | | |
|---|---|---|---|
| 2004/0219930 A1* | 11/2004 | Lin | H04W 64/00 455/456.1 |
| 2005/0096066 A1 | 5/2005 | Lee | |
| 2007/0109962 A1* | 5/2007 | Leng | H04B 7/15542 370/229 |
| 2009/0061899 A1 | 3/2009 | Huang et al. | |
| 2010/0323720 A1 | 12/2010 | Jen | |
| 2011/0124347 A1 | 5/2011 | Chen et al. | |

FOREIGN PATENT DOCUMENTS

| | | |
|---|---|---|
| CN | 101455001 A | 6/2009 |
| CN | 102065537 A | 5/2011 |
| CN | 102118851 A | 7/2011 |
| EP | 1558045 A1 | 7/2005 |
| WO | 2010151829 A3 | 12/2010 |

OTHER PUBLICATIONS

3rd Generation Partnership Project; Technical Specification Group Radio Access Network; Evolved Universal Terrestrial Radio Access (E-UTRA); Requirements for support of radio resource management (Release 10), 3GPP TS 36.133, V10.3.0, Jun. 2011, 457 pages.

3rd Generation Partnership Project; Technical Specification Group Radio Access Network; Evolved Universal Terrestrial Radio Access (E-UTRA); Evolved Universal Terrestrial Radio Access (E-UTRA), LTE Positioning Protocol A (LPPa) (Release 10) 3GPP TS 36.455, V10.1.0, Jun. 2011, 52 pages.

* cited by examiner

| IE/Group Name (IE/Group Name) | Presence (Presence) | Range (Range) | IE type and reference (IE type and reference) | Semantics description (Semantics description) |
|---|---|---|---|---|
| (Observed time difference of arrival cell information) OTDOA Cell Information | | 1 to <maxnoOTDOAtypes> | | |
| >CHOICE *OTDOA Cell Information Item* | M | | | |
| ... | | | | |
| >>Access Point Index | O | | | |

FIG. 10

| IE/Group Name (IE/Group Name) | Presence (Presence) | Range (Range) | IE type and reference (IE type and reference) | Semantics description (Semantics description) |
|---|---|---|---|---|
| Serving Cell ID (Serving Cell ID) | M | | ECGI 9.2.6 | E-UTRAN Cell Identifier of the serving cell (E-UTRAN Cell Identifier of the serving cell) |
| Serving Cell TAC (Serving Cell TAC) | M | | OCTET STRING(2) | Tracking Area Code of the serving cell (Tracking Area Code of the serving cell) |
| E-UTRAN Access Point Position (E-UTRAN Access Point Position) | O | | 9.2.8 | The geographical position of the E-UTRAN access point (The geographical position of the E-UTRAN access point) |
| Measured results (Measured Results) | | 0 to maxnoMeas | | |
| >CHOICE Measured Results Value | M | | | |
| ... | | | | |
| >> eNB Rx-Tx offset | | | | |
| >>Access Point Index | M | | | |

FIG. 11

METHOD AND APPARATUS FOR POSITIONING USER EQUIPMENT

This application is a continuation of International Application No. PCT/CN2012/080561, filed on Aug. 24, 2012, which claims priority to Chinese Patent Application No. 201110248280.4, filed on Aug. 24, 2011, both of which are hereby incorporated by reference in their entireties.

TECHNICAL FIELD

The present invention relates to the field of intelligent communications systems, and in particular, to a method and an apparatus for positioning a user equipment.

BACKGROUND

A positioning technology is a technology used to determine a geographical position of a UE (user equipment), which can obtain position information of the UE directly or indirectly by using resources of a radio communications network.

A UE positioning algorithm of LTE (long term evolution) can generally detect feature parameters (signal strength, time difference of arrival of a propagated signal, arrival direction angle of a signal, and the like) of a radio wave propagated signal between a UE and a base station, for example, an eNB, and then estimate a geometric position of the user equipment according to a related positioning algorithm. A GNSS (global navigation satellite system) positioning method requires a UE to have a radio receiver that receives a GNSS signal, and specific implementations of GNSS includes GPS (global positioning system) positioning, Galileo positioning, and the like. Downlink positioning and e-CID (enhanced cell ID) positioning are both network positioning types. These positioning types mainly rely on detection of radio resource feature parameters in a mobile communications system, and estimate a position of a UE according to a positioning algorithm, which are focuses of current researches. In OTDOA (observed time difference of arrival) positioning the UE receives, downlink positioning reference signals from multiple eNBs and performs timing measurement, and reports a time difference of arrival of PRSs (positioning reference signal) between the eNBs. Then, a geographical position of the UE is calculated on a network positioning server.

With the development of a network, some RRHs (remote radio head) or Repeater nodes are used to increase coverage of the network and ensure service quality of hotspot areas within the network. However, the RRH or the Repeater is equivalent to one intermediate node added between the UE and the eNB, and radio signals are not sent to the UE directly by the eNB but are forwarded by the RRH or the Repeater to the UE. As a result, a new delay and error are brought to the positioning. How to position a UE accurately in a scenario where an RRH or a Repeater exists is a technical issue to be solved.

SUMMARY OF THE INVENTION

Embodiments of the present invention provide a method and an apparatus for positioning a user equipment, which solve a problem that a large error occurs when a UE is positioned by using a positioning technology.

A method for positioning a user equipment includes receiving positioning measurement information sent by a base station. The positioning measurement information includes a sum of a difference between receiving time and sending time on the UE and a difference between receiving time and sending time on the base station, coordinates of an intermediate node when the base station sends a signal to the UE through the intermediate node, a device index number of the intermediate node, and a time interval between time when the base station sends a signal to the intermediate node and time when the intermediate node sends a signal to the UE. The difference between receiving time and sending time on the UE is a time difference between time when the UE sends an uplink reference signal and time when the UE receives a cell reference signal CRS and the difference between receiving time and sending time on the base station is a time difference between time when the base station receives the uplink reference signal and time when the base station sends the CRS. The CRS includes a CRS sent by the base station to the UE and/or a CRS sent by the base station to the UE through the intermediate node. A round trip time between the intermediate node that sends the CRS and the UE is calculated according to the positioning measurement information. Using position coordinates of the intermediate node that sends the CRS and the round trip time, a position of the UE is calculated.

An apparatus for positioning a user equipment includes a first receiving unit, which is configured to receive positioning measurement information sent by a base station. The positioning measurement information includes a sum of a difference between receiving time and sending time on the UE and a difference between receiving time and sending time on the base station, coordinates of an intermediate node when the base station sends a signal to the UE through the intermediate node, a device index number of the intermediate node, and a time interval between time when the base station sends a signal to the intermediate node and time when the intermediate node sends a signal to the UE. The difference between receiving time and sending time on the UE is a time difference between time when the UE sends an uplink reference signal and time when the UE receives a cell reference signal CRS and the difference between receiving time and sending time on the base station is a time difference between time when the base station receives the uplink reference signal and time when the base station sends the CRS. The CRS includes a CRS sent by the base station to the UE and/or a CRS sent by the base station to the UE through the intermediate node. A first calculating unit is configured to calculate, according to the positioning measurement information received by the first receiving unit, a round trip time between the intermediate node that sends the CRS and the UE. A first determining unit is configured to determine a position of the UE using position coordinates of the intermediate node that sends the CRS and the round trip time calculated by the first calculating unit.

By using the method and the apparatus for positioning a user equipment provided by the embodiment of the present invention, firstly, positioning measurement information sent by a base station is received. The positioning measurement information includes a sum of a difference between receiving time and sending time on the UE and a difference between receiving time and sending time on the base station, coordinates of an intermediate node when the base station sends a signal to the UE through the intermediate node, a device index number of the intermediate node, and a time interval between time when the base station sends a signal to the intermediate node and time when the intermediate node sends a signal to the UE, where the difference between receiving time and sending time on the UE is a time difference between time when the UE sends an uplink reference signal and time when the UE receives a cell reference signal CRS and the difference between receiving time and sending time on the base station is a time difference between time when the base station receives the uplink reference signal and time when the base station sends the CRS, where the CRS includes a CRS sent by the base station to the UE and/or a CRS sent by the base station to the UE through the intermediate node; then, a round trip time between the intermediate node that sends the CRS and the UE is calculated according to the positioning measurement information; and finally, a position of the UE is determined by using position coordinates of the intermediate node that sends the CRS and the round trip time. The embodiment of the present invention overcomes a problem that an intermediate node introduces a delay, and implements positioning of a user equipment while solving a problem that, when an intermediate node exists, a large error occurs when a user equipment is positioned by using a positioning technology.

A method for positioning a user equipment includes receiving positioning configuration information sent by at least two base stations. The positioning configuration information includes a device index number of an intermediate node that belongs to a base station and which sends the positioning configuration information, position coordinates of the intermediate node, and positioning reference signal PRS configuration information, where the PRS configuration information includes PRS configuration information from the base station and/or PRS configuration information from the intermediate node belonging to the base station. The received positioning configuration information is sent to a user equipment UE to instruct the UE to receive, according to the PRS configuration information, a PRS sent by the base station or the intermediate node to the UE, and to calculate, according to arrival time of the PRS, a reference signal time difference RSTD. The RSTD sent by the UE is received and, and according to the RSTD and the position coordinates of the base station or the intermediate node that sends the PRS, a position of the UE is determined.

An apparatus for positioning a user equipment includes a first receiving unit, which is configured to separately receive positioning configuration information sent by at least two base stations. The positioning configuration information includes a device index number of an intermediate node which belongs to a base station and which sends the positioning configuration information, position coordinates of the intermediate node, and positioning reference signal PRS configuration information. The PRS configuration information includes PRS configuration information from the base station and/or PRS configuration information from the intermediate node belonging to the base station. A first calculating unit is configured to send the positioning configuration information received by the first receiving unit to a user equipment UE to instruct the UE to receive, according to the PRS configuration information, a PRS sent by the base station or the intermediate node to the UE, and to calculate, according to arrival time of the PRS, a reference signal time difference RSTD. A second receiving unit is configured to receive the RSTD sent by the UE. A first determining unit is configured to determine, according to the RSTD received by the second receiving unit and the position coordinates of the base station or the intermediate node that sends the PRS, a position of the UE.

By using the method and the apparatus for positioning a user equipment provided by the embodiment of the present invention, firstly, positioning configuration information sent by at least two base stations is received, where the positioning configuration information includes a device index number of an intermediate node which belongs to a base station and which sends the positioning configuration information, position coordinates of the intermediate node, and positioning reference signal PRS configuration information, where the PRS configuration information includes PRS configuration information from the base station and/or PRS configuration information from the intermediate node belonging to the base station; then, the received positioning configuration information is sent to a user equipment UE to instruct the UE to receive, according to the PRS configuration information, a PRS sent by the base station or the intermediate node to the UE, and calculate, according to arrival time of the PRS, a reference signal time difference RSTD; and finally, the RSTD sent by the UE is received, and a position of the UE is determined according to the RSTD and the position coordinates of the base station or the intermediate node that sends the PRS. The embodiment of the present invention implements positioning of a user equipment while solving a problem that, when an intermediate node exists, a large error occurs when a user equipment is positioned by using a positioning technology.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art can still derive other drawings from these accompanying drawings without creative efforts.

FIG. 10 is a primitive diagram of improved OTDOA LPPa signaling; and

FIG. 11 is a primitive diagram of modified TS36.455 LPPa signaling.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

OTDOA is a common positioning technology. The principle of OTDOA is described as follows. When three or more base stations eNBs exist in a system, a position of a UE can be determined according to a time difference of arrival of downlink transmission signals of different eNBs. The downlink transmission signals may be reference signals or synchronization signals. According to a definition of a hyperbola, points with a constant difference between distances to two fixed points form one hyperbola. A difference between a distance from eNB0 to a terminal and a distance from eNB1 to the terminal form a hyperbola, and a difference between the distance from eNB1 to the terminal and a distance from eNB2 to the terminal form another hyperbola. An intersecting point between two hyperbolas is the position of the UE. The greater the quantity of eNBs in the system is, the more accurate the determined position of the UE is.

However, in a scenario where an RRH or a Repeater exists, if a UE is connected to the RRH or the Repeater, a PRS received by the UE is forwarded by the RRH or the Repeater. Because an RSTD is a time difference with respect to a straight line distance from the eNB to the UE, if the PRS is forwarded by the RRH or the Repeater in the middle, a new delay and a new error will occur, resulting that a position of the UE cannot be calculated accurately by using a positioning algorithm.

E-CID is another common positioning technology. So long as a CGI (Cell Global Identification, cell global identification) of a serving eNB corresponding to a UE is found and it is assumed that the served UE always falls into coverage of the serving eNB, a network side database can be searched for corresponding information of the eNB corresponding to the CGI, and then the geographical position of the eNB can be used to represent an activity area of the UE. However, after an RRH or a Repeater are used, a straight line no longer exists between the UE and the eNB. Therefore, an RTT (round trip time, round trip time) time is a round trip time after the RRH or the Repeater is passed, and cannot represent a straight line distance between the UE and the eNB. If this RTT time is used as a positioning circle, a large error will be caused.

To make the advantages of the technical solutions of the present invention more comprehensible, the following further describes the present invention in detail with reference to the accompanying drawings and embodiments.

Figure 1:
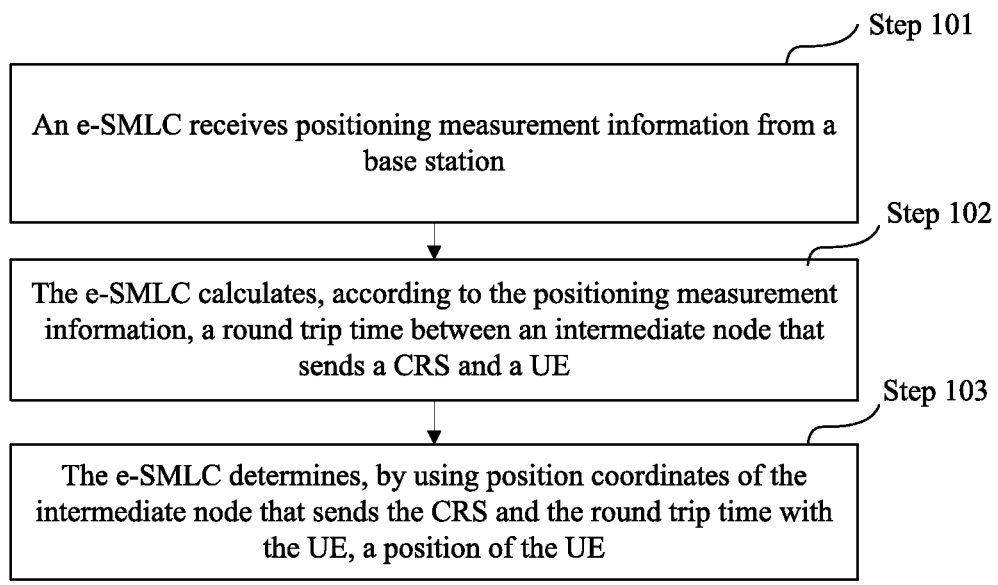
FIG. 1 is a flowchart of a method for positioning a user equipment according to Embodiment 1 of the present invention.

A first embodiment (Embodiment 1) provides a method for positioning a user equipment. As shown in FIG. 1, the method includes the following steps.

Step 101: An e-SMLC (evolved serving mobile location center) receives positioning measurement information sent by a base station.

The positioning measurement information includes a sum of a difference between receiving time and sending time on a UE and a difference between receiving time and sending time on the base station, coordinates of an intermediate node when the base station sends a signal to the UE through the intermediate node, a device index number of the intermediate node, and a time interval between time when the base station sends a signal to the intermediate node and time when the intermediate node sends a signal to the UE, where the difference between receiving time and sending time on the UE is a time difference between time when the UE sends an uplink reference signal and time when the UE receives a cell reference signal CRS and the difference between receiving time and sending time on the base station is a time difference between time when the base station receives the uplink reference signal and time when the base station sends the CRS, where the CRS includes a CRS sent by the base station to the UE and/or a CRS sent by the base station to the UE through the intermediate node.

With respect to the time difference between time when the UE sends the uplink reference signal and time when the UE receives the cell reference signal CRS, because sending and receiving may not be performed in a same subframe in a TDD system, the foregoing time difference includes a time offset for compensating the two uplink and downlink subframes.

With respect to the time difference between time when the eNB receives the uplink reference signal and time when the eNB sends the CRS, because sending and receiving may not be performed in a same subframe in a TDD system, the foregoing time difference includes a time offset for compensating the two uplink and downlink subframes.

Step 102: The e-SMLC calculates, according to the positioning measurement information, a round trip time between the intermediate node that sends the CRS and the UE.

Step 103: The e-SMLC determines, by using position coordinates of the intermediate node that sends the CRS and the round trip time, a position of the UE.

For example, if the intermediate node is an RRH, the RRH serves as a reference point, $\Delta 1$ represents a forwarding delay of the RRH, and $\Delta 2$ represents a transmission delay from the RRH to the eNB. Because the ENB knows a position of the RRH, $\Delta 2$ can be obtained according to a distance between the eNB and the RRH. On the other hand, $\Delta 1$ can be obtained by using hardware parameters. The distance between the UE and the RRH is calculated as follows: (eNB Rx−Tx+UE Rx−Tx)/ $2-\Delta 2-\Delta 1)*c$, where c represents the speed of light. Therefore, a positioning circle is formed by using the coordinates of the RRH as a center of the circle and using the distance between the UE and the RRH as a radius, and then the position of the UE can be finally determined by using an arrival angle of an uplink signal of the UE.

Figure 4:
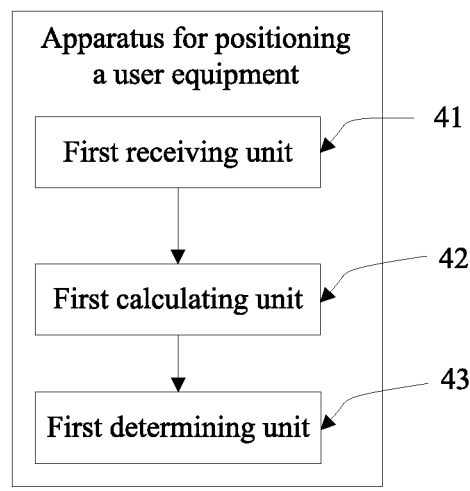
FIG. 4 is a schematic structural diagram of an apparatus for positioning a user equipment according to Embodiment 1 of the present invention.

This embodiment provides an apparatus for positioning a user equipment, where the positioning apparatus may be an e-SMLC. As shown in FIG. 4, the positioning apparatus includes a first receiving unit 41, a first calculating unit 42, and a first determining unit 43.

The first receiving unit 41 is configured to receive positioning measurement information sent by a base station.

The positioning measurement information includes a sum of a difference between receiving time and sending time on the UE and a difference between receiving time and sending time on the base station, coordinates of an intermediate node when the base station sends a signal to the UE through the intermediate node, a device index number of the intermediate node, and a time interval between time when the base station sends a signal to the intermediate node and time when the intermediate node sends a signal to the UE, where the difference between receiving time and sending time on the UE is a time difference between time when the UE sends an uplink reference signal and time when the UE receives a cell reference signal CRS and the difference between receiving time and sending time on the base station is a time difference between time when the base station receives the uplink reference signal and time when the base station sends the CRS, where the CRS includes a CRS sent by the base station to the UE and/or a CRS sent by the base station to the UE through the intermediate node.

With respect to the time difference between time when the UE sends the uplink reference signal and time when the UE receives the cell reference signal CRS, because sending and receiving may not be performed in a same subframe in a TDD system, the foregoing time difference includes a time offset for compensating the two uplink and downlink subframes.

With respect to the time difference between time when the eNB receives the uplink reference signal and time when the eNB sends the CRS, because sending and receiving may not be performed in a same subframe in a TDD system, the foregoing time difference includes a time offset for compensating the two uplink and downlink subframes.

The first calculating unit 42 is configured to calculate, according to the positioning measurement information received by the first receiving unit 41, a round trip time between the intermediate node that sends the CRS and the UE.

The first determining unit 43 is configured to determine, by using position coordinates of the intermediate node that sends the CRS and the round trip time calculated by the first calculating unit 42, a position of the UE.

For example, if the intermediate node is an RRH, the RRH serves as a reference point, $\Delta 1$ represents a forwarding delay of the RRH, and $\Delta 2$ represents a transmission delay from the RRH to the eNB. Because the eNB knows a position of the RRH, $\Delta 2$ can be obtained according to a distance between the eNB and the RRH. On the other hand, $\Delta 1$ can be obtained by using hardware parameters. The distance between the UE and the RRH is calculated as follows: (eNB Rx−Tx+UE Rx−Tx)/2−$\Delta 2$−$\Delta 1$)*c, where c represents the speed of light. Therefore, a positioning circle is formed by using the coordinates of the RRH as a center of the circle and using the distance between the UE and the RRH as a radius, and then the position of the UE can be finally determined by using an arrival angle of an uplink signal of the UE.

By using the method and the apparatus for positioning a user equipment provided by the embodiment of the present invention, firstly, positioning measurement information sent by a base station is received, where the positioning measurement information includes a sum of a difference between receiving time and sending time on the UE and a difference between receiving time and sending time on the base station, coordinates of an intermediate node when the base station sends a signal to the UE through the intermediate node, a device index number of the intermediate node, and a time interval between time when the base station sends a signal to the intermediate node and time when the intermediate node sends a signal to the UE, where the difference between receiving time and sending time on the UE is a time difference between time when the UE sends an uplink reference signal and time when the UE receives a cell reference signal CRS and the difference between receiving time and sending time on the base station is a time difference between time when the base station receives the uplink reference signal and time when the base station sends the CRS, where the CRS includes a CRS sent by the base station to the UE and/or a CRS sent by the base station to the UE through the intermediate node; then, a round trip time between the intermediate node that sends the CRS and the UE is calculated according to the positioning measurement information; and finally, a position of the UE is determined by using position coordinates of the intermediate node that sends the CRS and the round trip time. The embodiment of the present invention overcomes a problem that an intermediate node introduces a delay, and implements positioning of a user equipment while solving a problem that, when an intermediate node exists, a large error occurs when a user equipment is positioned by using a positioning technology.

Figure 2:
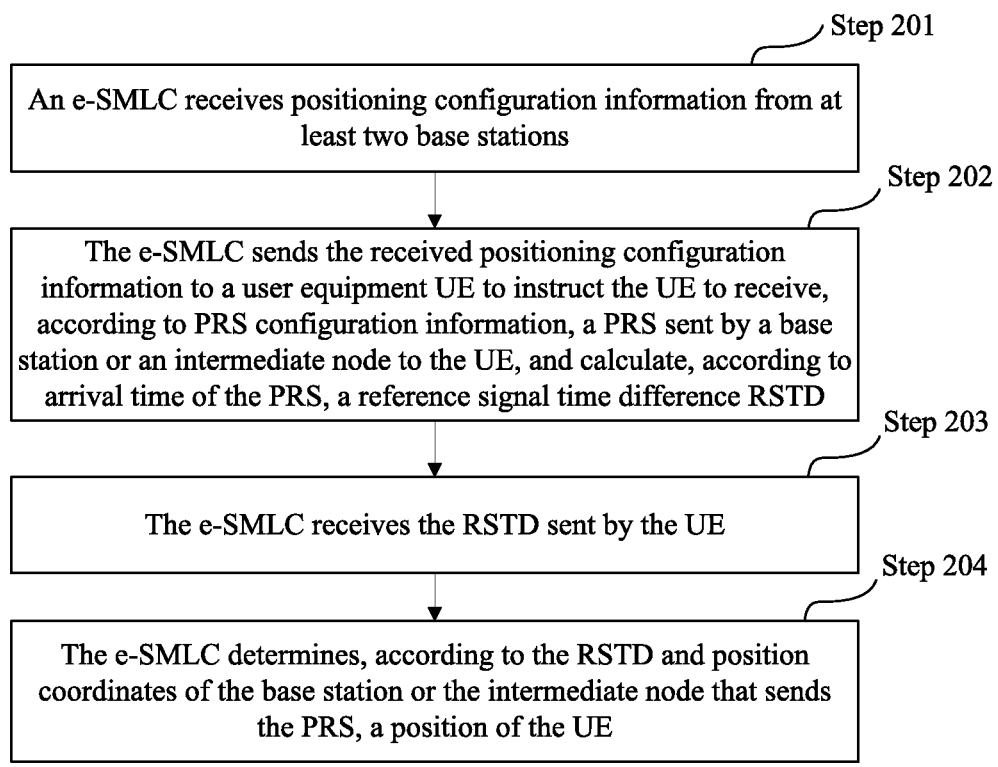
FIG. 2 is a flowchart of another method for positioning a user equipment according to Embodiment 1 of the present invention.

This embodiment provides another method for positioning a user equipment. As shown in FIG. 2, the method includes the following steps.

Step 201: An e-SMLC separately receives positioning configuration information sent by at least two base stations.

The positioning configuration information includes a device index number of an intermediate node which belongs to a base station and which sends the positioning configuration information, position coordinates of the intermediate node, and positioning reference signal PRS configuration information, where the PRS configuration information includes PRS configuration information from the base station and/or PRS configuration information from the intermediate node belonging to the base station.

Optionally, the positioning configuration information may further include an additional delay of the intermediate node corresponding to the base station. The additional delay is a time interval between time when the base station sends a signal to the intermediate node and time when the intermediate node sends a signal to the UE.

The coordinates of the intermediate node are reported during 3GPP TS36.455 LPPa signaling exchange The eNB does not need to add an additional new information element IE, and the position of the intermediate node only needs to be reported as a coordinate position of an E-UTRAN Access Point Position. The e-SMLC queries PRS configuration information of the eNB, and the eNB needs to add a primitive Access Point Index (an index number of the intermediate node) when returning the PRS configuration information of the eNB, as shown in FIG. 10.

Because multiple intermediate nodes may exist within coverage of the eNB, when the eNB feeds back PRS configuration information, the eNB reports PRS configuration information of all intermediate nodes within the coverage of the eNB. After receiving the configuration information reported by the eNB, the E-SMLC knows time when the PRS of each intermediate node is sent and a device index number of each intermediate node.

Optionally, when returning the PRS configuration information of the eNB, the eNB may add a primitive Access Point offset (an additional delay of the intermediate node). A mapping relationship exists between the Access Point offset and the Access Point Index, that is, the index number of each intermediate node corresponds to the additional delay of the intermediate node. A mapping relationship exists between the Access Point offset and the Access Point Index, that is, the index number of each intermediate node corresponds to the additional delay of the intermediate node. The additional delay is a time interval between time when the base station sends a signal to the intermediate node and time when the intermediate node sends a signal to the UE.

Step 202: The e-SMLC sends the received positioning configuration information to a user equipment UE to instruct the UE to receive, according to the PRS configuration information, a PRS sent by the base station or the intermediate node to the UE, and calculate, according to arrival time of the PRS, a reference signal time difference RSTD.

The e-SMLC sends, according to information provided by the eNB, positioning assistance information to the UE by using LPP, where the positioning assistance information also needs to include information of the Access Point Index. A signaling primitive is as follows:

```
-- ASN1START
    OTDOA-ReferenceCellInfo ::= SEQUENCE {
        physCellId                      INTEGER (0..503),
        cellGlobalId                    ECGI
OPTIONAL,           -- Need ON
        earfcnRef                       ARFCN-ValueEUTRA
OPTIONAL,           -- Cond
        accessPointIndex                AccessPointIndex  OPTIONAL,
        NotSameAsServ0
            antennaPortConfig           ENUMERATED {ports1-or-2, ports4, ... }
                OPTIONAL,               -- Cond NotSameAsServ1
        cpLength                        ENUMERATED    {    normal,
extended, ... },
        prsInfo                         PRS-Info
OPTIONAL,           -- Cond PRS
        ...
    }
-- ASN1STOP
-- ASN1START
    OTDOA-NeighbourCellInfoList ::=  SEQUENCE  (SIZE  (1..maxFreqLayers))  OF
OTDOA-NeighbourFreqInfo
    OTDOA-NeighbourFreqInfo   ::=   SEQUENCE   (SIZE   (1..24))   OF   OTDOA-
NeighbourCellInfoElement
    OTDOA-NeighbourCellInfoElement ::= SEQUENCE {
        physCellId                      INTEGER (0..503),
        cellGlobalId                    ECGI
OPTIONAL,           -- Need ON
        earfcn                          ARFCN-ValueEUTRA
OPTIONAL,           -- Cond
        accessPointIndex    AccessPointIndex OPTIONAL,
        NotSameAsRef0
        cpLength                                      ENUMERATED
{normal, extended, ...}
            OPTIONAL,                   -- Cond NotSameAsRef1
        prsInfo                         PRS-Info
OPTIONAL,           -- Cond NotSameAsRef2
            antennaPortConfig           ENUMERATED {ports-1-or-2, ports-4, ...}
                OPTIONAL,               -- Cond NotsameAsRef3
        slotNumberOffset                INTEGER(0..19)      OPTIONAL,
-- Cond NotSameAsRef4
        prs-SubframeOffset              INTEGER (0..1279)  OPTIONAL,
-- Cond InterFreq
        expectedRSTD                             INTEGER (0..16383),
        expectedRSTD-Uncertainty                 INTEGER (0..1023),
        ...
    }
    maxFreqLayers   INTEGER ::= 3
-- ASN1STOP
```

Step 203: The e-SMLC receives the RSTD sent by the UE.

When the UE reports an RSTD measurement result, the UE also adds the information of the Access Point Index to the IE reported by using the LPP. The signaling primitive is as follows:

```
-- ASN1START
OTDOA-SignalMeasurementInformation ::= SEQUENCE {
    systemFrameNumber   BIT STRING (SIZE (10)),
    physCellIdRef       INTEGER (0..503),
    cellGlobalIdRef     ECGI
OPTIONAL,
    earfcnRef           ARFCN-ValueEUTRA
OPTIONAL,
    accessPointIndex    AccessPointIndex  OPTIONAL,
    referenceQuality        OTDOA-MeasQuality      OPTIONAL,
        neighbourMeasurementList   NeighbourMeasurementList,
    ...
}
    NeighbourMeasurementList      ::=      SEQUENCE
(SIZE(1..24))    OF NeighbourMeasurementElement
    NeighbourMeasurementElement ::= SEQUENCE {
        physCellIdNeighbor      INTEGER (0..503),
        cellGlobalIdNeighbour   ECGI          OPTIONAL,
        earfcnNeighbour                       ARFCN-ValueEUTRA
OPTIONAL,
        accessPointIndex    AccessPointIndex  OPTIONAL,
```

-continued

```
        rstd                INTEGER (0..12711),
        rstd-Quality        OTDOA-MeasQuality,
        ...
    }
-- ASN1STOP
```

In this way, a positioning server knows a specific intermediate node under a specific eNB to which a delay to be converted belongs.

Step 204: The e-SMLC determines, according to the RSTD and the position coordinates of the base station or the intermediate node that sends the PRS, a position of the UE.

Figure 3:
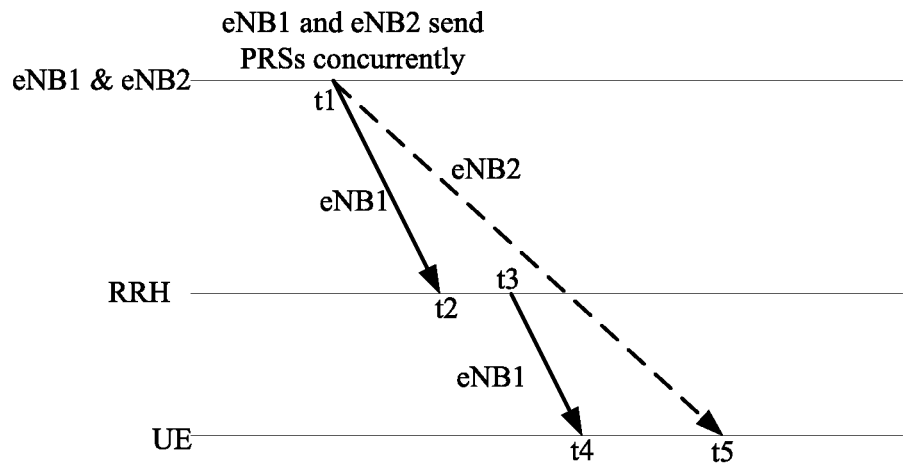
FIG. 3 is a schematic diagram illustrating calculation of an RSTD after an RRH is used.

For example, in an embodiment, the intermediate node is an RRH, and the scenario is shown in FIG. 3, where eNB1 and eNB2 send PRSs concurrently (if eNB1 and eNB2 do not send PRSs concurrently, the time interval between time when eNB1 sends a PRS and time when eNB2 sends a PRS should be known by the e-SMLC. For simplicity, it is assumed that eNB1 and eNB2 send PRSs concurrently). eNB2 sends a PRS to the UE directly rather than through the RRH, and therefore, a delay in this path is t5−t1; and eNB1 sends a PRS to the UE through the RRH, and therefore, a delay in the path from the RRH to the UE is t4−t3. Therefore, if the RRH and eNB2 are used as two positioning reference points, an RSTD value of the two reference points measured by the UE are as follows: RSTD_RRH=(t5−t1)−(t4−t3)=(t5−t1)−[(t4−t1)−(t3−t1)], where t3−t1=Δ (including time (t2−t1) from eNB1 to the RRH and a forwarding delay (t3−t2) of the RRH). Therefore, the formula can be changed to: RSTD_RRH=t5−t4+Δ. Because the UE can only report the RSTD result measured by the UE, that is, t5−t4, the eNB needs to report Δ to ensure that the e-SMLC can obtain a real RSTD when the RRH and eNB2 serve as reference points. Then, a positioning hyperbola can be obtained according to positions of the RRH and eNB2.

Figure 5:
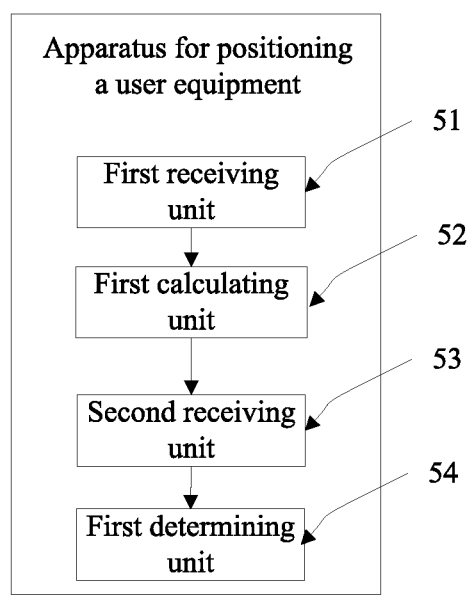
FIG. 5 is a schematic structural diagram of another apparatus for positioning a user equipment according to Embodiment 1 of the present invention.

This embodiment provides another apparatus for positioning a user equipment, where the positioning apparatus may be an e-SMLC. As shown in FIG. 5, the positioning apparatus includes a first receiving unit 51, a first calculating unit 52, a second receiving unit 53, and a determining unit 54.

The first receiving unit 51 is configured to separately receive positioning configuration information sent by at least two base stations, where the positioning configuration information includes a device index number of an intermediate node which belongs to a base station and which sends the positioning configuration information, position coordinates of the intermediate node, and positioning reference signal PRS configuration information, where the PRS configuration information includes PRS configuration information from the base station and/or PRS configuration information from the intermediate node belonging to the base station.

The coordinates of the intermediate node are reported during 3GPP TS36.455 LPPa signaling exchange. The eNB does not need to add an additional new information element IE, the position of the intermediate node only needs to be reported as a coordinate position of an E-UTRAN Access Point Position. The e-SMLC queries PRS configuration information of the eNB, and the eNB needs to add a primitive Access Point Index (an index number of the intermediate node) when returning the PRS configuration information of the eNB, as shown in FIG. 10.

Optionally, when returning the PRS configuration information of the eNB, the eNB may add a primitive Access Point offset (an additional delay of the intermediate node). A mapping relationship exists between the Access Point offset and the Access Point Index, that is, the index number of each intermediate node corresponds to the additional delay of the intermediate node. A mapping relationship exists between the Access Point offset and the Access Point Index, that is, the index number of each intermediate node corresponds to the additional delay of the intermediate node. The additional delay is a time interval between time when the base station sends a signal to the intermediate node and time when the intermediate node sends a signal to the UE.

The first calculating unit 52 is configured to send the positioning configuration information received by the first receiving unit 51 to a user equipment UE to instruct the UE to receive, according to the PRS configuration information, a PRS sent by the base station or the intermediate node to the UE and calculate, according to arrival time of the PRS, a reference signal time difference RSTD.

The second receiving unit 53 is configured to receive the RSTD sent by the UE.

The first determining unit 54 is configured to determine a position of the target UE according to the RSTD received by the second receiving unit 53 and the position coordinates of the base station or the intermediate node that sends the PRS.

For example, in an embodiment, the intermediate node is an RRH, and the scenario is shown in FIG. 3, where eNB1 and eNB2 send PRSs concurrently (if eNB1 and eNB2 do not send PRSs concurrently, the time interval between time when eNB1 sends a PRS and time when eNB2 sends a PRS should be known by the e-SMLC. For simplicity, it is assumed that eNB1 and eNB2 send PRSs concurrently). eNB2 sends a PRS to the UE directly rather than through the RRH, and therefore, a delay in this path is t5−t1; and eNB1 sends a PRS to the UE through the RRH, and therefore, a delay in the path from the RRH to the UE is t4−t3. Therefore, if the RRH and eNB2 are used as two positioning reference points, an RSTD value of the two reference points measured by the UE are as follows: RSTD_RRH=(t5−t1)−(t4−t3)=(t5−t1)−[(t4−t1)−(t3−t1)], where t3−t1=Δ (including time (t2−t1) from eNB1 to the RRH and a forwarding delay (t3−t2) of the RRH). Therefore, the formula can be changed to: RSTD_RRH=t5−t4+Δ. Because the UE can only report an RSTD result measured by the UE, that is, t5−t4, the eNB needs to report Δ to ensure that the e-SMLC can obtain a real RSTD when the RRH and eNB2 serve as reference points, and then a positioning hyperbola can be obtained according to positions of the RRH and eNB2.

By using the method and the apparatus for positioning a user equipment provided by the embodiment of the present invention, firstly, positioning configuration information sent by at least two base stations is received, where the positioning configuration information includes a device index number of an intermediate node which belongs to a base station and which sends the positioning configuration information, position coordinates of the intermediate node, and positioning reference signal PRS configuration information, where the PRS configuration information includes PRS configuration information from the base station and/or PRS configuration information from the intermediate node belonging to the base station; then, the received positioning configuration information is sent to a user equipment UE to instruct the UE to receive, according to the PRS configuration information, a PRS sent by the base station or the intermediate node to the UE, and calculate, according to arrival time of the PRS, a reference signal time difference RSTD; and finally, the RSTD sent by the UE is received, and a position of the UE is determined according to the RSTD and the position coordinates of the base station or the intermediate node that sends the PRS. The embodiment of the present invention implements positioning of a user equipment while solving a problem that, when an intermediate node exists, a large error occurs when a user equipment is positioned by using a positioning technology.

Figure 6A:
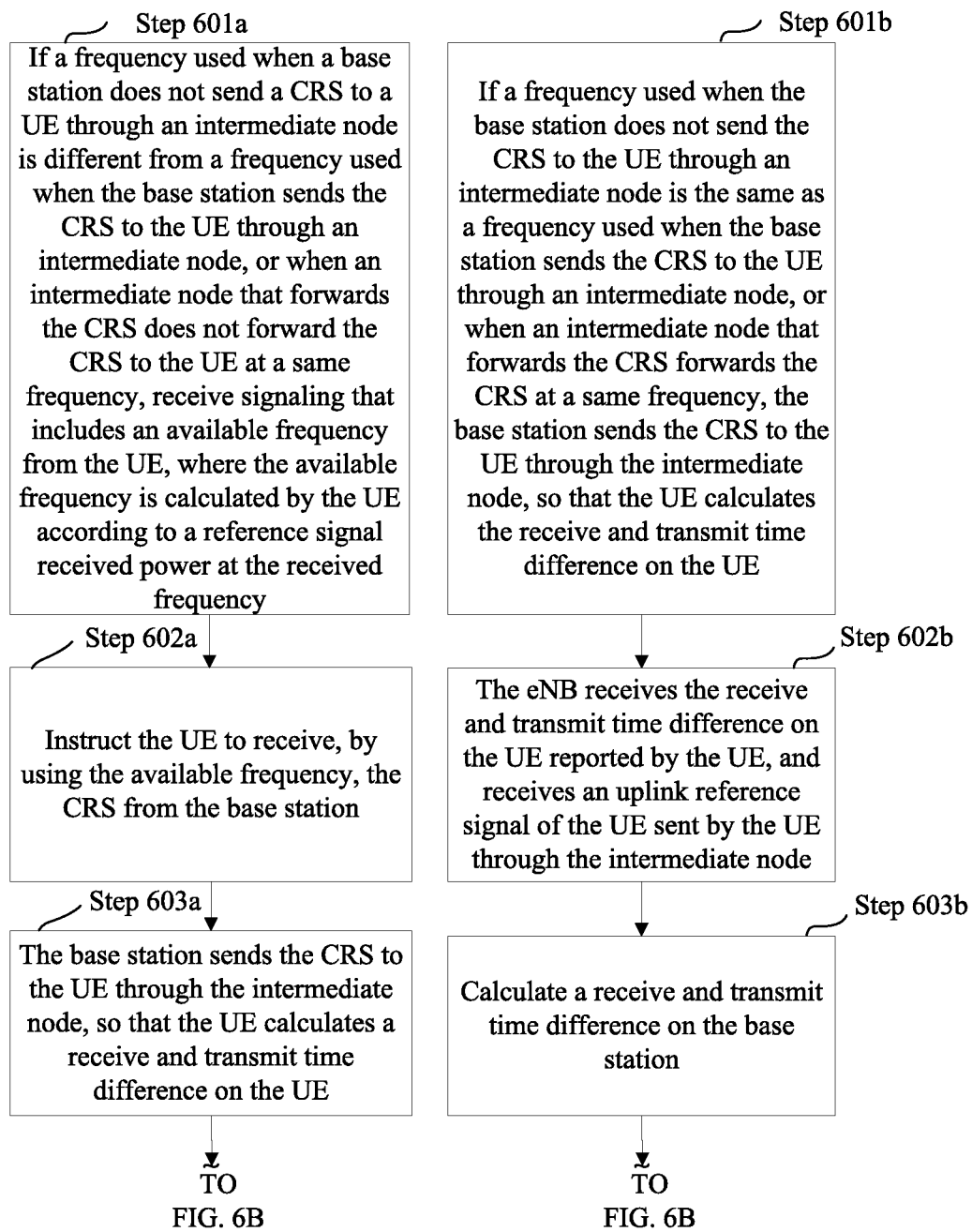
FIG. 6A and FIG. 6B are a flowchart of a method for positioning a user equipment according to Embodiment 2 of the present invention.
Figure 6B:
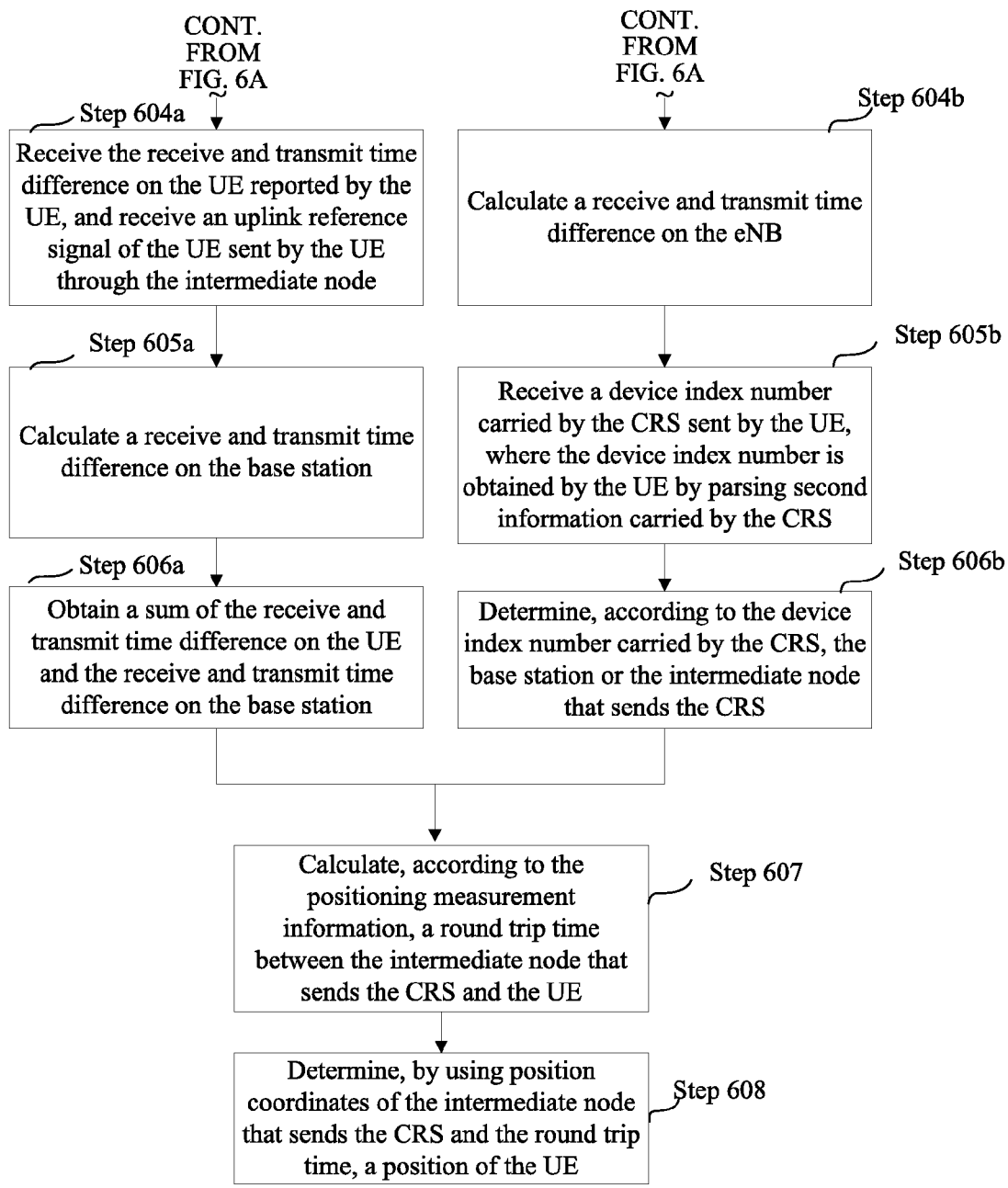

Another embodiment (Embodiment 2) provides a method for positioning a user equipment. As shown in FIG. 6A and FIG. 6B, the method includes the following steps.

Step 601a: If a frequency used when a base station does not send a CRS to a UE through an intermediate node is different from a frequency used when the base station sends the CRS to the UE through an intermediate node, or if an intermediate node that forwards the CRS does not forward the CRS to the UE at a same frequency, receive signaling that includes information of an available frequency and is sent by the UE, where the available frequency is calculated by the UE according to a reference signal received power at the received frequency.

Specifically, the UE calculates, according to $$\forall j, j \neq i \frac{\sum RSRP\_f(i)}{\sum RSRP\_f(j)} \geq thr,$$

to obtain unavailable frequencies, where f(i) represents any frequency, f(j) represents any frequency, RSRP_f(i) represents a reference signal received power at frequency f(i), RSRP_f(j) represents a reference signal received power at frequency f(j), and thr represents a set threshold, and the UE determines the available frequency according to the unavailable frequencies.

For example, (1) with respect to any carrier j(j≠i), for several cells already measured by the UE, if a sum of RSRPs of these cells received by the UE on carrier i is always one threshold (thr) greater than a sum of RSPRs of these cells received by the UE on carrier j, it is considered that the current UE is covered by a Repeater on carrier i. (2) The UE informs the eNB or an e-SMLC that the current UE is covered by a Repeater; and if the macro eNB covers multiple Repeaters, which Repeater covers the UE can also be judged according to signal strengths of other different cells measured by the UE. The UE finds, according to the analysis in (1), that the UE is covered by a Repeater. Therefore, the UE reports to the eNB (RRC signaling) or to the e-SMLC (LPP signaling) to inform that the current UE is covered by a Repeater on carrier i. (3) After the e-SMLC receives a report from the UE or the eNB that the UE to be positioned currently is covered by an unknown Repeater (serving carrier i) on the network, the e-SMLC eliminates carrier i, and specifies that the UE undergo positioning measurement on another carrier not covered by the Repeater.

Step 602a: Instruct the UE to receive, by using the available frequency, the CRS sent by the base station.

Step 603a: The base station sends the CRS to the UE through the intermediate node, so that the UE calculates a difference between receiving time and sending time on the UE.

Step 604a: Receive the difference between receiving time and sending time on the UE reported by the UE, and receive an uplink reference signal of the UE sent by the UE through the intermediate node.

Step 605a: Calculate a difference between receiving time and sending time on the base station.

Step 606a: Obtain a sum of the difference between receiving time and sending time on the UE and the difference between receiving time and sending time on the base station.

When the difference between receiving time and sending time on the UE is calculated, a path of the uplink reference signal sent by the UE and selected to participate in the calculation and a path of the cell reference signal received by the UE and selected to participate in the calculation are uplink-downlink symmetric. When the difference between receiving time and sending time on the base station is calculated, a path of the uplink reference signal received by the base station and selected to participate in the calculation and a path of the cell reference signal sent by the base station and selected to participate in the calculation are uplink-downlink symmetric, where the path of the uplink reference signal sent by the UE is consistent with the path of the uplink reference signal received by the base station; and the path of the cell reference signal received by the UE is consistent with the path of the cell reference signal sent by the base station.

For example, a path of the difference between receiving time and sending time of a downlink reference signal measured by the UE does not pass an intermediate node, while an uplink reference signal (for example, a sounding signal) of the UE reaches the eNB through an intermediate node, which results that the difference between receiving time and sending times measured by the eNB and the UE have no direct physical relation because they go along different paths. Therefore, for this scenario, the creativity of the present invention is that the UE and the eNB are restricted to measuring difference between receiving and sending times in symmetric uplink and downlink paths to perform positioning.

According to specifications in the current 3GPP TS36.133, in a carrier aggregation CA scenario, the difference between receiving time and sending time Rx-Tx of the UE can only be calculated in a primary cell Pcell. After an RRH or a Repeater is used, one UE may be concurrently covered by the RRH or the Repeater and covered directly by the eNB. The eNB is connected to the UE through the RRH or the Repeater. Because the RRH or the Repeater is closer to the UE, coverage of the RRH or the Repeater may be selected as the Pcell according to channel quality and a corresponding carrier is a primary component carrier PCC. The eNB may also be connected to the UE directly, but channel quality between the eNB and the UE is not so good. Therefore, the eNB may be selected to provide coverage of a secondary cell Scell, and a corresponding carrier is a secondary component carrier SCC.

In this case, it may be found that, if the UE Rx-Tx is still measured in the Pcell, an additional delay will inevitably be caused by the RRH or the Repeater. Therefore, an agreement on UE Rx-Tx measurement needs to be reached, that is, when the eNB and the RRH/Repeater can cover the UE concurrently, the UE may choose to perform the Rx-Tx measurement in a cell directly covered by the eNB. For example, the UE may choose to perform the UE Rx-Tx measurement in the Scell. In other words, a rule protected by the present invention is as follows: If the UE may be directly covered by the eNB and may be directly covered by the RRH or the Repeater, the Rx-Tx measurement of the UE and the eNB needs to be performed in a cell (or a corresponding CC) of the eNB that covers the UE directly rather than through the RRH or the Repeater. This limits the Rx-Tx measurement behaviors of the UE and the eNB, without the need to define new signaling.

Step 607: Calculate, according to the positioning measurement information, a round trip time between the intermediate node that sends the CRS and the UE.

Step 608: Determine, by using position coordinates of the intermediate node that sends the CRS and the round trip time, a position of the UE.

Step 601b: If a frequency used when the base station does not send the CRS to the UE through an intermediate node is the same as a frequency used when the base station sends the CRS to the UE through an intermediate node, or if an intermediate node that forwards the CRS forwards the CRS at a same frequency, the base station sends the CRS to the UE through the intermediate node, so that the UE calculates a difference between receiving time and sending time on the UE.

Step 602b: The eNB receives the difference between receiving time and sending time on the UE reported by the UE, and receives an uplink reference signal of the UE sent by the UE through the intermediate node.

Step 603b: Calculate a difference between receiving time and sending time on the base station.

Step 604b: Obtain a sum of the difference between receiving time and sending time on the UE and the difference between receiving time and sending time on the base station.

Step 605b: Receive a device index number carried by the CRS and sent by the UE, where the device index number is obtained by the UE by parsing second information carried by the CRS.

The second information is time information carried by the CRS, or the information is a feature sequence carried by the CRS, or the information is time information carried by the CRS and a feature sequence carried by the CRS.

When the information is time information carried by the CRS, a time division mode is used; when the information is a preset feature sequence of the CRS, a code division mode is used; and if the frequency used when the base station does not send the CRS to the UE through an intermediate node is different from the frequency used when the base station sends the CRS to the UE through an intermediate node, or if the intermediate node that forwards the CRS does not forward the CRS to the UE at a same frequency, an index number of the intermediate node can be obtained by using a frequency division mode. In addition, the foregoing three modes may be used in combination.

Specifically, (1) combination of time division and code division: When there are insufficient time domain resources, for one time point, sources of reference signals may be further differentiated by using the code division mode, so that index numbers of devices that send the reference signals are obtained accordingly; or, when there are insufficient code division resources, for one code word, sources of reference signals may be further differentiated by using the time division mode, so that index numbers of devices that send the reference signals are obtained accordingly. For example, if the time domain resources are m subframes and code domain resources are n code words (or scrambling sequences), a total number of device sources that can be differentiated is m*n.

(2) Combination of time division and frequency division: When there are insufficient time domain resources, for one time point, sources of reference signals may be further differentiated by using the frequency division mode, so that index numbers of devices that send the reference signals are obtained accordingly; or, when there are insufficient frequency resources, for one frequency, sources of reference signals may be further differentiated by using the time division mode, so that index numbers of devices that send the reference signals are obtained accordingly. For example, if the time domain resources are m subframes and the frequency resources are one frequency, a total number of device sources that can be differentiated is m*1.

(3) Combination of code division and frequency division: When there are insufficient code division resources, for one code word, sources of reference signals may be further differentiated by using the frequency division mode, so that index numbers of devices that send the reference signals are obtained accordingly; or, when there are insufficient frequency resources, for one frequency, sources of reference signals may be further differentiated by using the code division mode, so that index numbers of devices that send the reference signals are obtained accordingly. For example, if the code domain resources are n subframes (or scrambling sequences) and the frequency resources are one frequency, a total number of device sources that can be differentiated is n*1.

(4) Combination of time division, code division, and frequency division: When there are insufficient time domain resources or code domain resources or frequency resources, device sources that send reference signals may be differentiated by using a combination of the foregoing three modes. For example, if the time domain sources are m subframes, the code domain resources are n code words (or scrambling sequences), and the frequency resources are one frequency, a total number of device sources that can be differentiated is m*n*1.

Step 606b: Determine, according to the device index number carried by the CRS, the base station or the intermediate node that sends the CRS.

Specifically, when the eNB and the RRH belonging to the eNB do not send CRSs in a same subframe, a sending time relationship can be calculated by using the index of the RRH. For example, the eNB sends a CRS in subframe 1, RRH 1 sends a CRS in subframe 2, and RRH 2 sends a CRS in subframe 3, and so on; and an index of a subframe at which the CRS is sent can be obtained by using the RRH index. This sending time point information can be notified by the eNB to the UE in a broadcast channel (for example, MIB (Master Information Block)). A signaling accessPointIndex (access point index) represents an index of an access point, and the eNB and different RRHs belongs to the eNB have different indexes. An primitive of the signaling is as follows:

```
    AccessPointPattern ::= SEQUENCE (SIZE (1..maxnum)) OF
AccessPointPatternInfo
    AccessPointPatternInfo ::=                      SEQUENCE {
    accessPointIndex          AccessPointIndex
    crstimepattern            CRSTimePattern
    }.
```

Each index has different CRS sending timing. Because these RRHs and the eNB have a same ID, they have a same CRS sequence, with a difference only in the CRS sending timing corresponding to each index. This sending timing is included in a CRSTimePattern (CRS time pattern), where the pattern may be a group of bit sequences. For example, (1000) indicates that the CRS corresponding to the current index is sent in the first subframe of every four subframes. The length of a bit sequence depends on the quantity of RRHs belonging to the eNB, and is generally greater than (the quantity of RRHs+1). In addition, the pattern may also be a number, that is, an index of one pattern. Because the UE end pre-stores CRS sending timing corresponding to different pattern indexes, CRS sending timing corresponding to each RRH can be known according to the pattern index broadcast by the eNB. Maxnum represents the quantity of access points, including the eNB and the quantity of all RRHs in the cell under the eNB.

On the other hand, when the UE knows that the UE needs to perform UE rx-tx (difference between receiving time and sending time) measurement for e-CID positioning, the UE measures a downlink CRS located in a same subframe as the uplink sending timing of the UE (in a TDD system, the downlink CRS may not be located on a same subframe, but a time offset of the two uplink and downlink subframes needs to be compensated for), and then reports the index of the access point corresponding to timing of the CRS to the eNB or the e-SMLC while reporting the Rx-Tx. There are specifically two types of signaling modification: First, if the UE reports the UE Rx-Tx measurement to the eNB through an RRC, an RRC signaling primitive in 3GPP TS36.331 needs to be modified. The modified signaling primitive is as follows:

```
    MeasResultForECID-r9 ::=        SEQUENCE {
        ue-RxTxTimeDiffResult-r9      INTEGER (0..4095),
        accessPointIndex           INTEGER (0..maxnum),
        currentSFN-r9                        BIT STRING (SIZE
(10))
    }
``` where, accessPointIndex is the index of the access point. For example, it may be represented by an integer value, where a range of the integer depends on the quantity of access points (including the eNB and RRHs belonging to the eNB) in a local cell, which is represented by maxnum. Second, if the UE reports the UE Rx-Tx result to the e-SMLC directly through LPP (signaling), the LPP signaling primitive in 3GPP TS36.355 needs to be modified, where the modified signaling primitive is as follows:

```
MeasuredResultsElement ::= SEQUENCE {
    physCellId          INTEGER (0..503),
    cellGlobalId    CellGlobalIdEUTRA-AndUTRA    OPTIONAL,
    arfcnEUTR           ARFCN-ValueEUTRA,
    systemFrameNumber
                        BIT STRING (SIZE (10))
OPTIONAL,
    rsrp-Result         INTEGER (0..97)
OPTIONAL,
    rsrq-Result         INTEGER (0..34)
OPTIONAL,
    ue-RxTxTimeDiff     INTEGER (0..4095)
OPTIONAL,
    accessPointIndex INTEGER (0..maxnum)    OPTIONAL,
    ...
}
```
where accessPointIndex is the index number of the access point.

Further, when the eNB reports an aggregated measurement result to the e-SMLC, the eNB also needs to add the index number of the access point to the signaling. Modified LPPa signaling of TS36.455 is shown in FIG. 11.

Finally, after receiving the measurement report from the UE or the eNB, the e-SMLC can select, according to the index of the access point in the measurement report, a correct reference point to draw a positioning circle.

Step 607: Calculate, according to the positioning measurement information, a round trip time between the intermediate node that sends the CRS and the UE.

Step 608: Determine, by using the position coordinates of the intermediate node that sends the CRS and the round trip time, a position of the UE.

Figure 8:
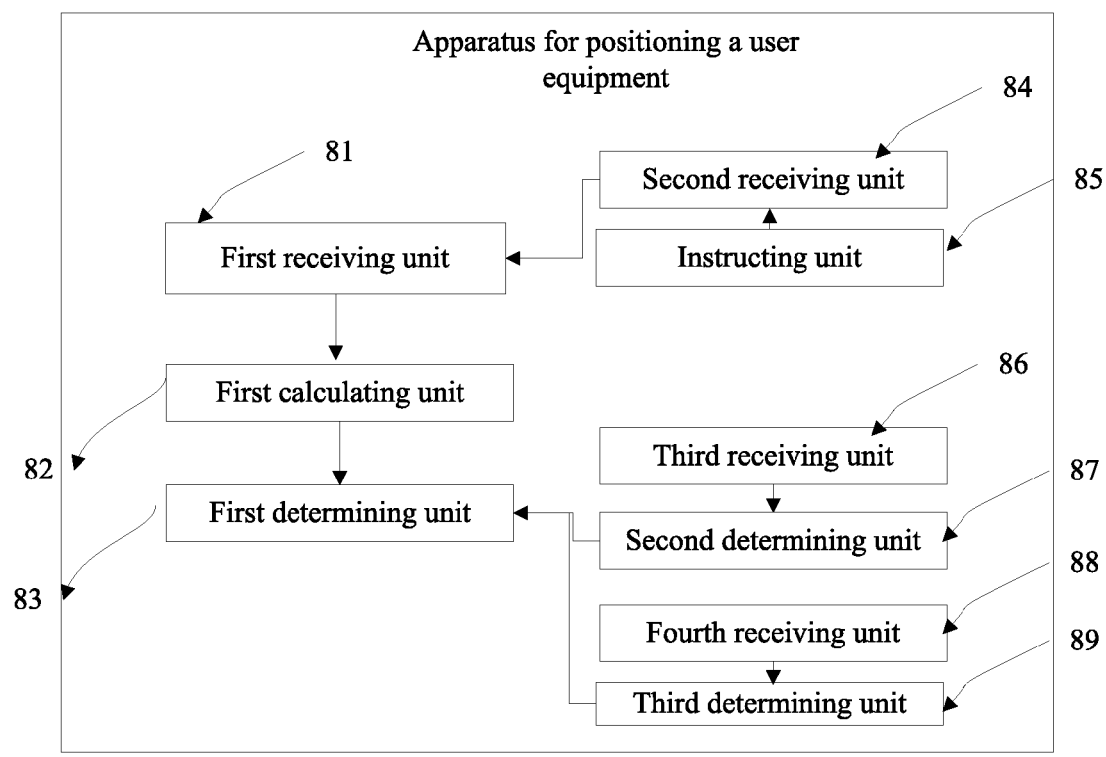
FIG. 8 is a schematic structural diagram of an apparatus for positioning a user equipment according to Embodiment 2 of the present invention.

This embodiment provides an apparatus for positioning a user equipment, where the positioning apparatus may be an e-SMLC. As shown in FIG. 8, the apparatus includes a first receiving unit 81, a first calculating unit 82, a first determining unit 83, a second receiving unit 84, an instructing unit 85, a third receiving unit 86, a second determining unit 87, a fourth receiving unit 88, and a third determining unit 89.

The first receiving unit 81 is configured to receive positioning measurement information sent by a base station.

The positioning measurement information includes a sum of a difference between receiving time and sending time on the UE and a difference between receiving time and sending time on the base station, coordinates of an intermediate node when the base station sends a signal to the UE through the intermediate node, a device index number of the intermediate node, and a time interval between time when the base station sends a signal to the intermediate node and time when the intermediate node sends a signal to the UE, where the difference between receiving time and sending time on the UE is a time difference between time when the UE sends an uplink reference signal and time when the UE receives a cell reference signal CRS and the difference between receiving time and sending time on the base station is a time difference between time when the base station receives the uplink reference signal and time when the base station sends the CRS, where the CRS includes a CRS sent by the base station to the UE and/or a CRS sent by the base station to the UE through the intermediate node.

The first calculating unit 82 is configured to calculate, according to the positioning measurement information received by the first receiving unit 81, a round trip time between the intermediate node that sends the CRS and the UE.

The first determining unit 83 is configured to determine, by using the position coordinates of the intermediate node that sends the CRS and the round trip time calculated by the first calculating unit 82, a position of the UE.

The second receiving unit 84 is configured to: if a frequency used when the base station does not send the CRS to the UE through an intermediate node is different from a frequency used when the base station sends the CRS to the UE through an intermediate node, or if an intermediate node that forwards the CRS does not forward the CRS to the UE at a same frequency, receive signaling that includes information of an available frequency and is sent by the UE, where the available frequency is calculated by the UE according to a reference signal received power at the received frequency.

Specifically, the UE calculates, according to $$\forall j, j \neq i \frac{\sum RSRP\_f(i)}{\sum RSRP\_f(j)} \geq thr,$$

to obtain unavailable frequencies, where f(i) represents any frequency, f(j) represents any frequency, RSRP_f(i) represents a reference signal received power at frequency f(i), RSRP_f(j) represents a reference signal received power at frequency f(j), and thr represents a set threshold, and the UE determines the available frequency according to the unavailable frequencies.

For example, an invisible intermediate node is a Repeater, (1) with respect to any carrier j(j≠i), for several cells already measured by the UE, if a sum of RSRPs of these cells received by the UE on carrier i is always one threshold (thr) greater than a sum of RSPRs of these cells received by the UE on carrier j, it is considered that the current UE is covered by a Repeater on carrier i. (2) The UE informs the eNB or an e-SMLC that the current UE is covered by a Repeater; and if the macro eNB covers multiple Repeaters, which Repeater covers the UE can be judged according to signal strengths of other different cells measured by the UE. The UE finds, according to the analysis in (1), that the UE is covered by a Repeater, and thus reports to the eNB (RRC signaling) or to the e-SMLC (LPP signaling) to inform that the current UE is covered by a Repeater on carrier i. (3) After the e-SMLC receives a report from the UE or the eNB that the UE to be positioned currently is covered by an unknown Repeater (serving carrier i) on the network, the e-SMLC eliminates carrier i, and specifies that the UE undergo positioning measurement on another carrier not covered by the Repeater.

The instructing unit 85 is configured to instruct the UE to receive, by using the available frequency, the CRS sent by the base station.

The third receiving unit 86 is configured to: if a frequency used when the base station does not send the CRS to the UE through an intermediate node is different from a frequency used when the base station sends the CRS to the UE through an intermediate node, or if an intermediate node that forwards the CRS does not forward the CRS to the UE at a same frequency, receive a device index number carried by the CRS and sent by the UE, where the device index number is obtained by the UE by parsing first information carried by the CRS, where the first information is frequency information carried by the CRS and time information carried by the CRS, or the first information is frequency information carried by the CRS and a feature sequence carried by the CRS, or the first information is frequency information carried by the CRS, a feature sequence carried by the CRS and time information carried by the CRS.

The second determining unit 87 is configured to obtain a device that sends the CRS according to the device index number corresponding to the CRS.

The fourth receiving unit 88 is configured to: if a frequency used when the base station does not send the CRS to the UE through an intermediate node is the same as a frequency used when the base station sends the CRS to the UE through an intermediate node, or if an intermediate node that forwards the CRS forwards the CRS to the UE at a same frequency, receive a device index number carried by the CRS and sent by the UE, where the device index number carried by the CRS is obtained by the UE by parsing second information carried by the CRS, where the second information is time information carried by the CRS, or the information is a feature sequence carried by the CRS, or the information is time information carried by the CRS and a feature sequence carried by the CRS.

The third determining unit 89 is configured to determine, according to the device index number carried by the CRS, the base station or the intermediate node that sends the CRS.

By using the method and the apparatus for positioning a user equipment provided by the embodiment of the present invention, firstly, positioning measurement information sent by a base station is received, where the positioning measurement information includes a sum of a difference between receiving time and sending time on the UE and a difference between receiving time and sending time on the base station, coordinates of an intermediate node when the base station sends a signal to the UE through the intermediate node, a device index number of the intermediate node, and a time interval between time when the base station sends a signal to the intermediate node and time when the intermediate node sends a signal to the UE, where the difference between receiving time and sending time on the UE is a time difference between time when the UE sends an uplink reference signal and time when the UE receives a cell reference signal CRS and the difference between receiving time and sending time on the base station is a time difference between time when the base station receives the uplink reference signal and time when the base station sends the CRS, where the CRS includes a CRS sent by the base station to the UE and/or a CRS sent by the base station to the UE through the intermediate node; then, a round trip time between the intermediate node that sends the CRS and the UE is calculated according to the positioning measurement information; and finally, a position of the UE is determined by using the position coordinates of the intermediate node that sends the CRS and the round trip time. The embodiment of the present invention overcomes a problem that an intermediate node introduces a delay, and implements positioning of a user equipment while solving a problem that, when an intermediate node exists, a large error occurs when a user equipment is positioned by using a positioning technology.

Figure 7A:
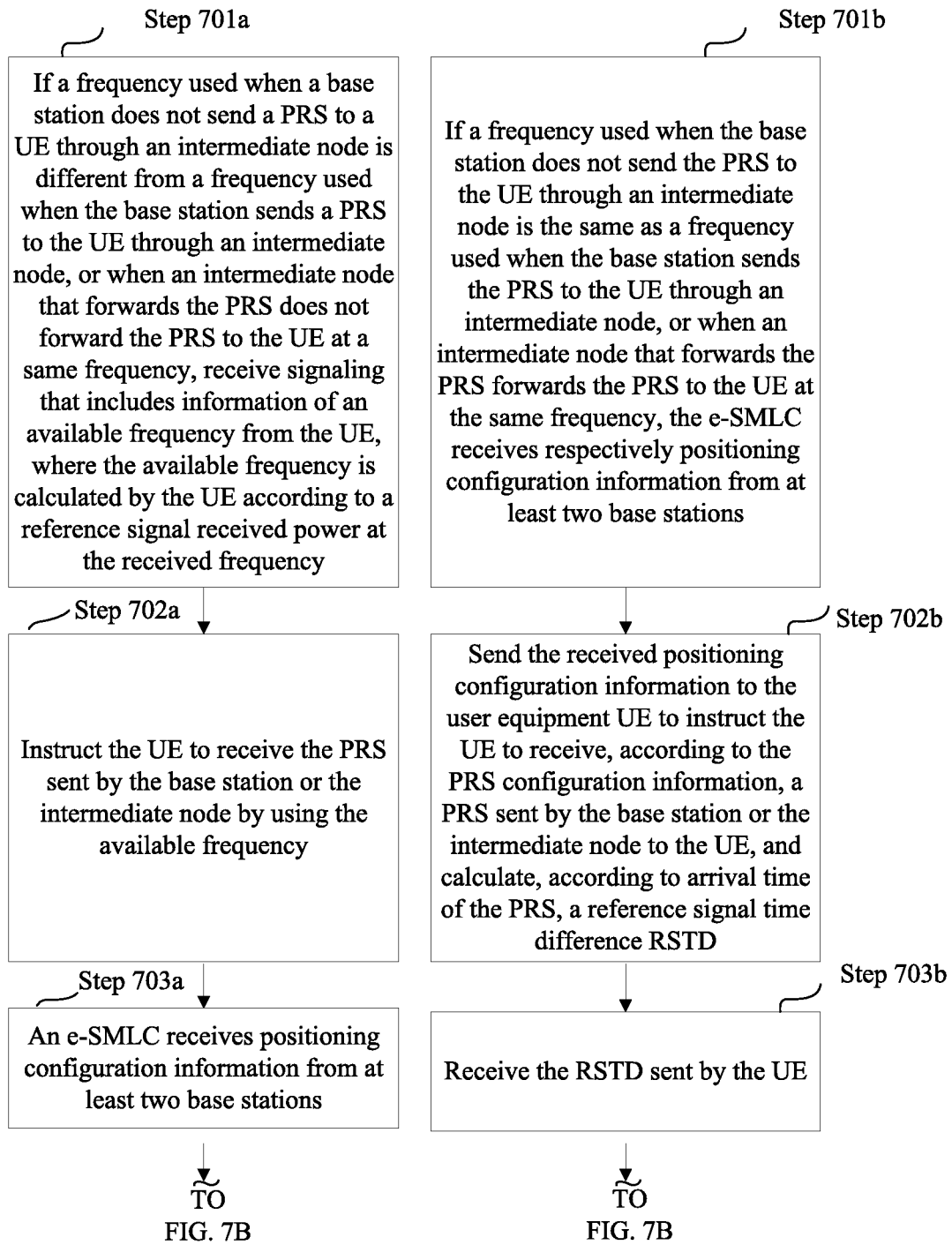
FIG. 7A and FIG. 7B are a flowchart of another method for positioning a user equipment according to Embodiment 2 of the present invention.
Figure 7B:
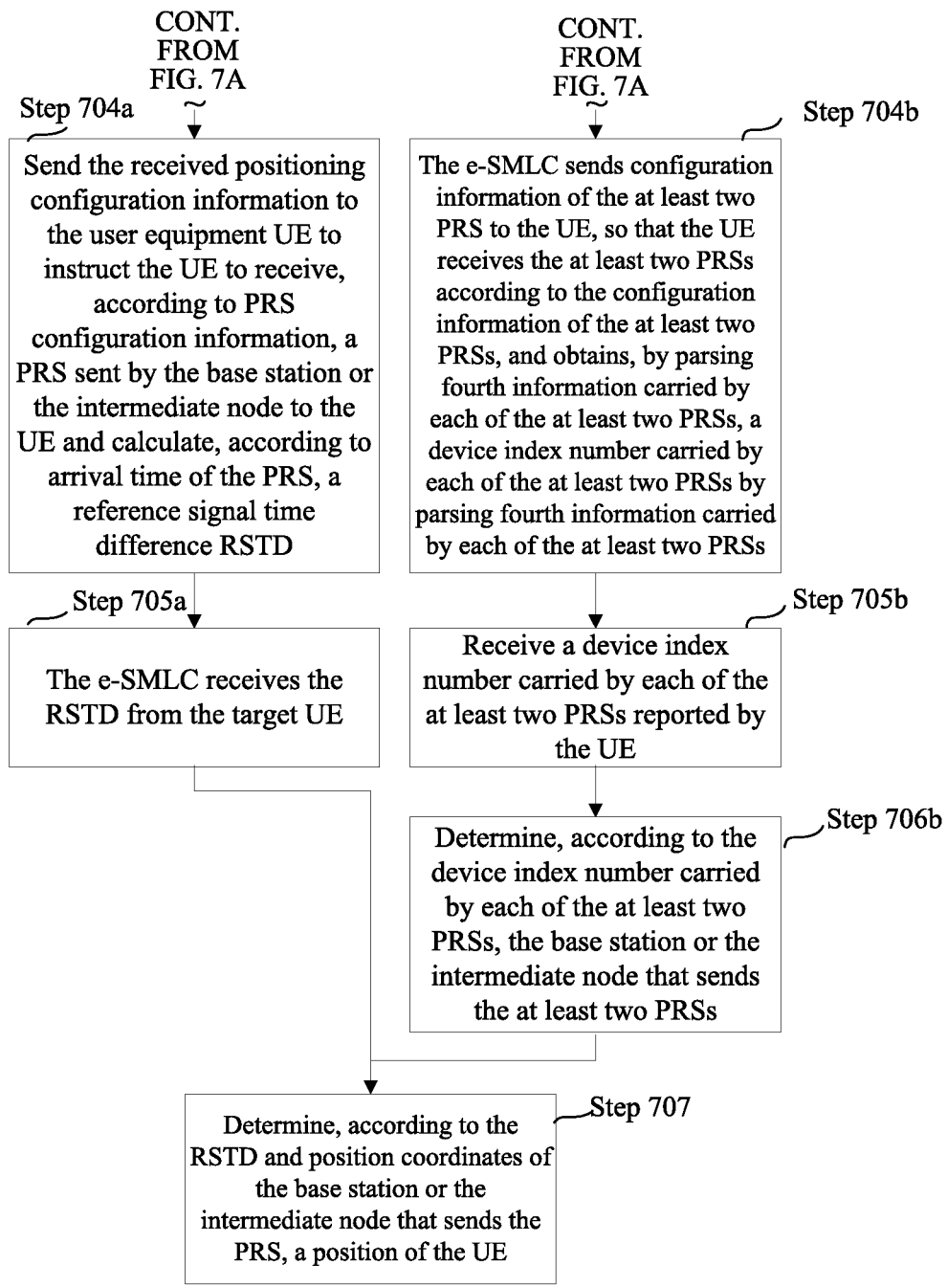

This embodiment provides another method for positioning a user equipment. As shown in FIG. 7A and FIG. 7B, the method includes:

Step 701a: If a frequency used when a base station does not send a PRS to a UE through an intermediate node is different from a frequency used when the base station sends the PRS to the UE through an intermediate node, or if an intermediate node that forwards the PRS does not forward the PRS to the UE at a same frequency, receive signaling that includes information of an available frequency and is sent by the UE, where the available frequency is calculated by the UE according to a reference signal received power at the received frequency.

Specifically, the UE calculates, according to $$\forall j, j \neq i \frac{\sum \text{RSRP\_f}(i)}{\sum \text{RSRP\_f}(j)} \geq thr,$$

to obtain unavailable frequencies, where f(i) represents any frequency, f(j) represents any frequency, RSRP_f(i) represents a reference signal received power at frequency f(i), RSRP_f(j) represents a reference signal received power at frequency f(j), and thr represents a set threshold, and the UE determines the available frequency according to the unavailable frequencies.

For example, (1) with respect to any carrier j(j≠i), for several cells already measured by the UE, if a sum of RSRPs of these cells received by the UE on carrier i is always one threshold (thr) greater than a sum of RSPRs of these cells received by the UE on carrier j, it is considered that the current UE is covered by a Repeater on carrier i. (2) The UE informs the eNB or an e-SMLC that the current UE is covered by a Repeater; and if the macro eNB covers multiple Repeaters, which Repeater covers the UE can be judged according to signal strengths of other different cells measured by the UE. The UE finds, according to the analysis in (1), that the UE is covered by a Repeater. Therefore, the UE reports to the eNB (RRC signaling) or to the e-SMLC (LPP signaling) to inform that the current UE is covered by a Repeater on carrier i. (3) After the e-SMLC receives a report from the UE or the eNB that the UE to be positioned currently is covered by an unknown Repeater (serving carrier i) on the network, the e-SMLC eliminates carrier i, and specifies that the UE undergo positioning measurement on another carrier not covered by the Repeater.

Step 702a: Instruct the UE to receive the PRS that is sent by the base station or the intermediate node by using the available frequency.

Step 703a: The e-SMLC separately receives positioning configuration information sent by at least two base stations.

The positioning configuration information includes a device index number of an intermediate node which belongs to a base station and which sends the positioning configuration information, position coordinates of the intermediate node, and positioning reference signal PRS configuration information, where the PRS configuration information includes PRS configuration information from the base station and/or PRS configuration information from the intermediate node belonging to the base station. Optionally, the positioning configuration information may further include an additional delay of the intermediate node corresponding to the base station. The additional delay is a time interval between time when the base station sends a signal to the intermediate node and time when the intermediate node sends a signal to the UE.

Specifically, the eNB reports corresponding configuration information "OTDOA INFORMATION RESPONSE" to the e-SMLC by using LPPa.

Step 704a: Send the received positioning configuration information to the user equipment UE to instruct the UE to receive, according to the PRS configuration information, a PRS sent by the base station or the intermediate node to the UE, and calculate, according to arrival time of the PRS, a reference signal time difference RSTD.

Step 705a: The e-SMLC receives the RSTD sent by the target.

Step 706a: Determine, according to the RSTD and the position coordinates of the base station or the intermediate node that sends the PRS, a position of the UE.

Step 701b: If a frequency used when the base station does not send the PRS to the UE through an intermediate node is the same as a frequency used when the base station sends the PRS to the UE through an intermediate node, or if an intermediate node that forwards the PRS forwards the PRS to the UE at the same frequency, the e-SMLC separately receives positioning configuration information sent by at least two base stations.

The positioning configuration information includes a device index number of an intermediate node which belongs to a base station and which sends the positioning configuration information, position coordinates of the intermediate node, and positioning reference signal PRS configuration information, where the PRS configuration information includes PRS configuration information from the base station and/or PRS configuration information from the intermediate node belonging to the base station.

Optionally, the positioning configuration information may further include an additional delay of the intermediate node corresponding to the base station. The additional delay is a time interval between time when the base station sends a signal to the intermediate node and time when the intermediate node sends a signal to the UE.

Step 702b: Send the received positioning configuration information to the user equipment UE to instruct the UE to receive, according to the PRS configuration information, a PRS sent by the base station or the intermediate node to the UE, and calculate, according to arrival time of the PRS, a reference signal time difference RSTD.

Step 703b: Receive the RSTD sent by the UE.

Step 704b: The e-SMLC e-SMLC sends configuration information of the at least two PRSs to the UE, so that the UE receives the at least two PRSs according to the configuration information of the at least two PRSs, and obtains, by parsing fourth information carried by each of the at least two PRSs, a device index number carried by each of the at least two PRSs, where the fourth information is time information carried by each of the at least two PRSs, or the fourth information is a feature sequence carried by each of the at least two PRSs, or the fourth information is time information carried by each of the at least two PRSs and a feature sequence carried by each of the at least two PRSs.

When the information is time information carried by the PRS, a time division mode is used; when the information is a preset feature sequence of the PRS, a code division mode is used; and if all devices that send PRSs to the UE are not at the same frequency, an index number of the intermediate node can be obtained by using a frequency division mode. In addition, the foregoing three modes may be used in combination.

Specifically, (1) combination of time division and code division: When there are insufficient time domain resources, for one time point, sources of reference signals may be further differentiated by using the code division mode, so that index numbers of devices that send the reference signals are obtained accordingly; or, when there are insufficient code division resources, for one code word, sources of reference signals may be further differentiated by using the time division mode, so that index numbers of devices that send the reference signals are obtained accordingly. For example, if the time domain resources are m subframes and code domain resources are n code words (or scrambling sequences), a total number of device sources that can be differentiated is $m*n$.

(2) Combination of time division and frequency division: When there are insufficient time domain resources, for one time point, sources of reference signals may be further differentiated by using the frequency division mode, so that index numbers of devices that send the reference signals are obtained accordingly; or, when there are insufficient frequency resources, for one frequency, sources of reference signals may be further differentiated by using the time division mode, so that index numbers of devices that send the reference signals are obtained accordingly. For example, if the time domain resources are m subframes and the frequency resources are one frequency, a total number of device sources that can be differentiated is $m*1$.

(3) Combination of code division and frequency division: When there are insufficient code division resources, for one code word, sources of reference signals may be further differentiated by using the frequency division mode, so that index numbers of devices that send the reference signals are obtained accordingly; or, when there are insufficient frequency resources, for one frequency, sources of reference signals may be further differentiated by using the code division mode, so that index numbers of devices that send the reference signals are obtained accordingly. For example, if the code domain resources are n code words (or scrambling sequences) and the frequency resources are one frequency, a total number of device sources that can be differentiated is $n*1$.

(4) Combination of time division, code division, and frequency division: When there are insufficient time domain resources or code domain resources or frequency resources, device sources that send reference signals may be differentiated by using a combination of the foregoing three modes. For example, if the time domain sources are m subframes, the code domain resources are n code words (or scrambling sequences), and the frequency resources are one frequency, a total number of device sources that can be differentiated is $m*n*1$.

Step 705b: Receive the device index number carried by each of the at least two PRSs and reported by the UE.

Step 706b: Determine, according to the device index number carried by each of the at least two PRSs, the base station or the intermediate node that sends the at least two PRSs.

For example, if the intermediate node is an RRH, when the eNB and the RRH send PRSs concurrently (at a same frequency), because a sequence of the PRSs is differentiated by using cell IDs but the RRH and the eNB are one cell and have only one cell ID, the UE cannot differentiate whether the received PRS is from the RRH or the eNB, nor can the e-SMLC differentiate whether the RSTD reported by the UE corresponds to the eNB or the RRH. Therefore, a final reference coordinate point used for positioning is different from an actual coordinate point. For example, a PRS is from the RRH and the RSTD is also calculated based on arrival time of the PRS from the RRH, but when the RSTD is reported to the e-SMLC for calculating a hyperbola, a reference point of the eNB is used, which causes a very large positioning error. A solution is as follows:

Firstly, when the eNB performs LPPa interaction with the e-SMLC, the eNB sends the index number index, corresponding coordinates, and PRS configuration of each RRH to the e-SMLC, where the PRS configuration includes sending time of the PRS, and different RRH indexes may correspond to different PRS sending times.

Secondly, when the e-SMLC sends auxiliary information to the UE, the e-SMLC informs the UE of PRS sending time corresponding to each RRH index. Definitely, these PRSs have a same sequence, with mere difference in the sending time point, that is, these PRSs have different PRS indexes in TS36.211.

Finally, the UE can estimate a PRS index (at which subframe within a PRS period the PRS is sent) of the UE according to a received PRS, and then can obtain, through mapping, an RRH index or know that the PRS is sent by the eNB; and finally, when the UE reports the RSTD, the UE reports the corresponding RRH index to the e-SMLC, so that the e-SMLC easily selects a proper positioning reference point.

Step 707: Determine, according to the RSTD and the position coordinates of the base station or the intermediate node that sends the PRS, a position of the UE.

Figure 9:
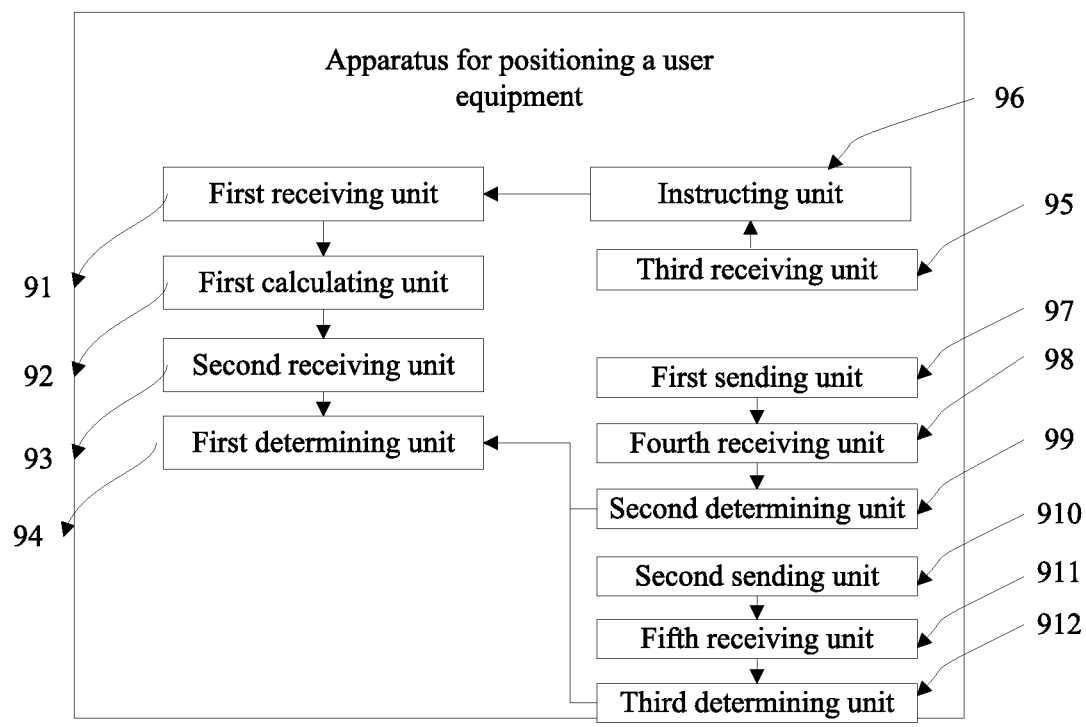
FIG. 9 is a schematic structural diagram of another apparatus for positioning a user equipment according to Embodiment 2 of the present invention.

This embodiment provides another apparatus for positioning a user equipment, where the positioning apparatus may be an e-SMLC. As shown in FIG. 9, the positioning apparatus includes a first receiving unit 91, a first calculating unit 92, a second receiving unit 93, a first determining unit 94, a third receiving unit 95, an instructing unit 96, a first sending unit 97, a fourth receiving unit 98, a second determining unit 99, a second sending unit 910, a fifth receiving unit 911, and a third determining unit 912.

The first receiving unit 91 is configured to separately receive positioning configuration information sent by at least two base stations.

The positioning configuration information includes a device index number of an intermediate node which belongs to a base station and which sends the positioning configuration information, position coordinates of the intermediate node, and positioning reference signal PRS configuration information, where the PRS configuration information includes PRS configuration information from the base station and/or PRS configuration information from the intermediate node belonging to the base station.

Optionally, the positioning configuration information may further include an additional delay of the intermediate node corresponding to the base station. The additional delay is a time interval between time when the base station sends a signal to the intermediate node and time when the intermediate node sends a signal to the UE.

Specifically, the base station eNB reports corresponding configuration information "OTDOA INFORMATION RESPONSE" to the e-SMLC by using LPPa.

The first calculating unit 92 is configured to send the positioning configuration information received by the first receiving unit 91 to a user equipment UE to instruct the UE to receive, according to the PRS configuration information, a PRS sent by the base station or the intermediate node to the UE and calculate, according to arrival time of the PRS, a reference signal time difference RSTD.

The second receiving unit 93 is configured to receive the RSTD sent by the UE.

The first determining unit 94 is configured to determine, according to the RSTD received by the second receiving unit 93 and the position coordinates of the base station or the intermediate node that sends the PRS, a position of the UE.

The third receiving unit 95 is configured to: if a frequency used when the base station does not send the PRS to the UE through an intermediate node is different from a frequency used when the base station sends the PRS to the UE through an intermediate node, or if an intermediate node that forwards the PRS does not forward the PRS to the UE at a same frequency, receive signaling that comprises information of an available frequency and is sent by the UE, where the available frequency is calculated by the UE according to a reference signal received power at the received frequency.

The instructing unit 96 is configured to instruct the UE to receive the PRS that is sent by the base station or the intermediate node by using the available frequency.

The first sending unit 97 is configured to: if a frequency used when the base station does not send the PRS to the UE through an intermediate node is different from a frequency used when the base station sends the PRS to the UE through an intermediate node, or if an intermediate node that forwards the PRS does not forward the PRS to the UE at a same frequency, send configuration information of at least two PRSs to the UE, so that the UE receives the at least two PRSs according to the configuration information of the at least two PRSs and obtains, by parsing third information carried by each of the at least two PRSs, a device index number carried by each of the at least two PRSs.

The third information is a feature sequence carried by each of the at least two PRSs and frequency information carried by each of the at least two PRSs, or the third information is sending time information carried by each of the at least two PRSs and frequency information carried by each of the at least two PRSs, or the third information is sending time information carried by each of the at least two PRSs, frequency information carried by each of the at least two PRSs, and a feature sequence carried by each of the at least two PRSs.

For example, if the intermediate node is an RRH, when the eNB and the RRH send PRSs concurrently (at a same frequency), because a sequence of the PRSs is differentiated by using cell IDs but the RRH and the eNB are one cell and have only one cell ID, the UE cannot differentiate whether the received PRS is from the RRH or the eNB, nor can the e-SMLC differentiate whether the RSTD reported by the UE corresponds to the eNB or the RRH. Therefore, a final reference coordinate point used for positioning is different from an actual coordinate point. For example, a PRS is from the RRH and the RSTD is also calculated based on arrival time of the PRS from the RRH, but when the RSTD is reported to the e-SMLC for calculating a hyperbola, a reference point of the eNB is used, which causes a very large positioning error. A solution is as follows:

Firstly, when the eNB performs LPPa interaction with the e-SMLC, the eNB sends the index number index, corresponding coordinates, and PRS configuration of each RRH to the e-SMLC, where the PRS configuration includes sending time of the PRS, and different RRH indexes may correspond to different PRS sending times.

Secondly, when the e-SMLC sends auxiliary information to the UE, the e-SMLC informs the UE of PRS sending time corresponding to each RRH index. Definitely, these PRSs have a same sequence, with mere difference in the sending time point, that is, these PRSs have different PRS indexes in TS36.211.

Finally, the UE can estimate a PRS index (at which subframe within a PRS period the PRS is sent) of the UE according to the received PRS, and then can obtain, through mapping, an RRH index or know that the PRS is sent by the eNB; and finally, when the UE reports the RSTD, the UE reports the corresponding RRH index to the e-SMLC, so that the e-SMLC easily selects a proper positioning reference point.

The fourth receiving unit 98 is configured to receive the device index number carried by each of the at least two PRSs and reported by the UE.

The second determining unit 89 is configured to determine, according to the device index number carried by each of the at least two PRSs, the base station or the intermediate node that sends the at least two PRSs.

The second sending unit 910 is configured to: if a frequency used when the base station does not send the PRS to the UE through an intermediate node is the same as a frequency used when the base station sends the PRS to the UE through an intermediate node, or if an intermediate node that forwards the PRS forwards the PRS to the UE at a same frequency, the e-SMLC sends configuration information of at least two PRSs to the UE, so that the UE receives the at least two PRSs according to the configuration information of the at least two PRSs and obtains, by parsing fourth information carried by each of the at least two PRSs, a device index number carried by each of the at least two PRSs.

The fourth information is time information carried by each of the at least two PRSs, or the fourth information is a feature sequence carried by each of the at least two PRSs, or the fourth information is time information carried by each of the at least two PRSs and a feature sequence carried by each of the at least two PRSs, where the information carried by each of the at least two PRSs is time information carried by each of the at least two PRSs, or the information carried by each of the at least two PRSs is a preset feature sequence carried by each of the at least two PRSs, or the information carried by each of the at least two PRSs is time information carried by each of the at least two PRSs and a preset feature sequence carried by each of the at least two PRSs.

The fifth receiving unit 911 is configured to receive a device index number carried by each of the at least two PRSs and reported by the UE.

The third determining unit 912 is configured to determine, according to the device index number carried by each of the at least two PRSs, the base station or the intermediate node that sends the at least two PRSs.

By using the method and the apparatus for positioning a user equipment provided by the embodiment of the present invention, firstly, positioning configuration information sent by at least two base stations is received, where the positioning configuration information includes a device index number of an intermediate node which belongs to a base station and which sends the positioning configuration information, position coordinates of the intermediate node, and positioning reference signal PRS configuration information, where the PRS configuration information includes PRS configuration information from the base station and/or PRS configuration information from the intermediate node belonging to the base station; then, the received positioning configuration information is sent to a user equipment UE to instruct the UE to receive, according to the PRS configuration information, a PRS sent by the base station or the intermediate node to the UE and calculate, according to arrival time of the PRS, a reference signal time difference RSTD; and finally, the RSTD sent by the UE is received, and a position of the UE is determined according to the RSTD and the position coordinates of the base station or the intermediate node that sends the PRS. The embodiment of the present invention implements positioning of a user equipment while solving a problem that, when an intermediate node exists, a large error occurs when a user equipment is positioned by using a positioning technology.

The apparatus for positioning a user equipment provided by the embodiment of the present invention can implement the foregoing method embodiments. For details about specific functions of the apparatus for positioning a user equipment, refer to the descriptions of the method embodiments, and the details are not further described herein. The method and the apparatus for positioning a user equipment provided by the embodiments of the present invention are applicable to the field of intelligent communications systems, but are not limited thereto.

A person of ordinary skill in the art can understand that a part of the processes of the methods in the foregoing embodiments may be implemented by a computer program instructing relevant hardware. The program may be stored in a computer readable storage medium. When the program runs, the processes of the methods in the embodiments are performed. The storage medium may be a magnetic disk, an optical disc, a read-only memory (Read-Only Memory, ROM), or a random access memory (Random Access Memory, RAM) or the like.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for positioning a user equipment (UE), the method comprising:

receiving positioning measurement information sent by a base station, wherein the positioning measurement information comprises a sum of a difference between receiving time and sending time on the UE and a difference between receiving time and sending time on the base station, coordinates of an intermediate node when the base station sends a signal to the UE through the intermediate node, a device index number of the intermediate node, and a time interval between a time when the base station sends a signal to the intermediate node and a time when the intermediate node sends a signal to the UE, wherein the difference between the receiving time and the sending time on the UE is a time difference between a time when the UE sends an uplink reference signal and a time when the UE receives a cell reference signal (CRS) and the difference between the receiving time and the sending time on the base station is a time difference between a time when the base station receives the uplink reference signal and a time when the base station sends the CRS, wherein the CRS comprises a CRS sent by the base station to the UE and/or a CRS sent by the base station to the UE through the intermediate node;

calculating, according to the positioning measurement information, a round trip time between the intermediate node that sends the CRS and the UE; and determining, a position of the UE using position coordinates of the intermediate node that sends the CRS and the round trip time.

2. The method according to claim 1, wherein the method further comprises:

sending, by the base station, the CRS to the UE through the intermediate node, so that the UE calculates the difference between receiving time and sending time on the UE;

receiving the difference between the receiving time and the sending time on the UE reported by the UE;

receiving the uplink reference signal of the UE sent by the UE through the intermediate node;

calculating the difference between the receiving time and the sending time on the base station; and obtaining the sum of the difference between the receiving time and the sending time on the UE and the difference between the receiving time and the sending time on the base station.

3. The method according to claim 1, wherein:

when the difference between receiving time and sending time on the UE is calculated, a path of the uplink reference signal sent by the UE and selected to participate in the calculation and a path of the cell reference signal received by the UE and selected to participate in the calculation are uplink-downlink symmetric; and when the difference between receiving time and sending time on the base station is calculated, a path of the uplink reference signal received by the base station and selected to participate in the calculation and a path of the cell reference signal sent by the base station and selected to participate in the calculation are uplink-downlink symmetric;

wherein the path of the uplink reference signal sent by the UE is consistent with the path of the uplink reference signal received by the base station; and wherein the path of the cell reference signal received by the UE is consistent with the path of the cell reference signal sent by the base station.

4. The method according to claim 1, wherein a frequency used when the base station does not send the CRS to the UE through an intermediate node is different from a frequency used when the base station sends the CRS to the UE through an intermediate node, or when an intermediate node that forwards the CRS does not forward the CRS to the UE at a same frequency, the method further comprising:

receiving signaling that comprises information of an available frequency and is sent by the UE, wherein the available frequency is calculated by the UE according to a reference signal received power at the received frequency; and instructing the UE to receive, by using the available frequency, the CRS sent by the base station.

5. The method according to claim 4, wherein the available frequency being calculated by the UE according to a reference signal received power at the received frequency comprises:

calculating, by the UE, according to $$\forall\, j,\, j \neq i \frac{\sum \text{RSRP\_f}(i)}{\sum \text{RSRP\_f}(j)} \geq thr,$$

to obtain unavailable frequencies, wherein f(i) represents any frequency, f(j) represents any frequency, RSRP_f (i) represents a reference signal received power at frequency f(i), RSRP_f (j) represents a reference signal received power at frequency f(j), and thr represents a set threshold, and determining, by the UE, the available frequency according to the unavailable frequencies.

6. The method according to claim 1, wherein a frequency used when the base station does not send the CRS to the UE through an intermediate node is different from a frequency used when the base station sends the CRS to the UE through an intermediate node, or when an intermediate node that forwards the CRS does not forward the CRS to the UE at a same frequency, the method further comprising:

receiving a device index number carried by the CRS and sent by the UE, wherein the device index number is obtained by the UE by parsing first information carried by the CRS, wherein the first information is frequency information carried by the CRS and time information carried by the CRS, or the first information is frequency information carried by the CRS and a feature sequence carried by the CRS, or the first information is frequency information carried by the CRS, a feature sequence carried by the CRS, and time information carried by the CRS; and determining, according to the device index number carried by the CRS, the base station or the intermediate node that sends the CRS.

7. The method according to claim 1, a frequency used when the base station does not send the CRS to the UE through an intermediate node is the same as a frequency used when the base station sends the CRS to the UE through an intermediate node, or when an intermediate node that forwards the CRS forwards the CRS to the UE at a same frequency, the method further comprising:

receiving a device index number carried by the CRS and sent by the UE, wherein the device index number carried by the CRS is obtained by the UE by parsing second information carried by the CRS, wherein the second information is time information carried by the CRS, or the second information is a feature sequence carried by the CRS, or the information is time information carried by the CRS and a feature sequence carried by the CRS; and determining, according to the device index number carried by the CRS, the base station or the intermediate node that sends the CRS.

8. A method for positioning a user equipment (UE), the method comprising:

receiving positioning configuration information sent by at least two base stations, wherein the positioning configuration information comprises a device index number of an intermediate node which belongs to a base station and which sends the positioning configuration information, position coordinates of the intermediate node, and positioning reference signal (PRS) configuration information, wherein the PRS configuration information comprises PRS configuration information from the base station and/or PRS configuration information from the intermediate node belonging to the base station;

receiving, when a frequency used when the base station does not send the PRS to a user equipment (UE) through an intermediate node is different from a frequency used when the base station sends the PRS to the UE through an intermediate node, or when an intermediate node that forwards the PRS does not forward the PRS to the UE at a same frequency, first signaling having information of an available frequency and is sent by the UE, wherein the available frequency is calculated by the UE according to a reference signal received power at the received frequency;

sending the received positioning configuration information to the UE to instruct the UE to receive, according to the PRS configuration information, a PRS sent by the base station or the intermediate node to the UE, and calculate, according to arrival time of the PRS, a reference signal time difference RSTD;

instructing, in response to receiving the first signaling, the UE to receive the PRS that is sent by the base station or the intermediate node by using the available frequency;

receiving the RSTD sent by the UE; and determining a position of the UE according to the RSTD and the position coordinates of the base station or the intermediate node that sends the PRS.

9. The method according to claim 8, wherein the available frequency being calculated by the UE according to a reference signal received power at the received frequency comprises:

calculating, by the UE, according to $$\forall j, j \neq i \frac{\sum \text{RSRP\_f}(i)}{\sum \text{RSRP\_f}(j)} \geq thr,$$

to obtain unavailable frequencies, wherein f(i) represents any frequency, f(j) represents any frequency, RSRP_f (i) represents a reference signal received power at frequency f(i), RSRP_f (j) represents a reference signal received power at frequency f(j), and thr represents a set threshold, and determining, by the UE, the available frequency according to the unavailable frequencies.

10. The method according to claim 8, wherein a frequency used when the base station does not send the PRS to the UE through an intermediate node is different from a frequency used when the base station sends the PRS to the UE through an intermediate node, or when an intermediate node that forwards the PRS does not forward the PRS to the UE at a same frequency, further comprising:

sending, by an e-SMLC, configuration information of at least two PRSs to the UE, so that the UE receives the at least two PRSs according to the configuration information of the at least two PRSs and obtains, by parsing third information carried by each of the at least two PRSs, a device index number carried by each of the at least two PRSs, wherein the third information is a feature sequence carried by each of the at least two PRSs and frequency information carried by each of the at least two PRS s, or the third information is sending time information carried by each of the at least two PRSs and frequency information carried by each of the at least two PRSs, or the third information is sending time information carried by each of the at least two PRS s, frequency information carried by each of the at least two PRSs, and a feature sequence carried by each of the at least two PRSs;

receiving the device index number carried by each of the at least two PRSs and reported by the UE; and determining, according to the device index number carried by each of the at least two PRSs, the base station or the intermediate node that sends the at least two PRSs.

11. The method according to claim 8, wherein a frequency used when the base station does not send the PRS to the UE through an intermediate node is the same as a frequency used when the base station sends the PRS to the UE through an intermediate node, or when an intermediate node that forwards the PRS forwards the PRS to the UE at a same frequency, further comprising:

sending, by an e-SMLC, configuration information of the at least two PRSs to the UE, so that the UE receives the at least two PRSs according to the configuration information of the at least two PRSs and obtains, by parsing fourth information carried by each of the at least two PRSs, a device index number carried by each of the at least two PRSs, wherein the fourth information is time information carried by each of the at least two PRSs, or the fourth information is a feature sequence carried by each of the at least two PRSs, or the fourth information is time information carried by each of the at least two PRSs and a feature sequence carried by each of the at least two PRSs;

receiving the device index number carried by each of the at least two PRSs and reported by the UE; and determining, according to the device index number carried by each of the at least two PRSs, the base station or the intermediate node that sends the at least two PRSs.

12. The method according to claim 8, wherein the method further comprises:

when the base station and the intermediate node work at a first frequency, sending, only by an intermediate node set in the intermediate node, the positioning reference signal at the first frequency.

13. The method according to claim 12, wherein no other intermediate node than the set intermediate node can send the positioning reference signal in a subframe that is at the first frequency and for sending the positioning reference signal.

14. An apparatus for positioning a user equipment, the apparatus comprising a computer including a non-transitory computer-readable medium storing program modules executable by the computer, the modules including:

a first receiving unit, configured to receive positioning measurement information sent by a base station, wherein the positioning measurement information comprises a sum of a difference between a receiving time and a sending time on the UE and a difference between a receiving time and a sending time on the base station, coordinates of an intermediate node when the base station sends a signal to the UE through the intermediate node, a device index number of the intermediate node, and a time interval between time when the base station sends a signal to the intermediate node and a time when the intermediate node sends a signal to the UE, wherein the difference between the receiving time and a sending time on the UE is a time difference between the time when the UE sends an uplink reference signal and the time when the UE receives a cell reference signal (CRS) and the difference between the receiving time and the sending time on the base station is a time difference between the time when the base station receives the uplink reference signal and the time when the base station sends the CRS, wherein the CRS comprises a CRS sent by the base station to the UE and/or a CRS sent by the base station to the UE through the intermediate node;

a first calculating unit, configured to calculate, according to the positioning measurement information received by the first receiving unit, a round trip time between the intermediate node that sends the CRS and the UE; and a first determining unit, configured to determine, by using position coordinates of the intermediate node that sends the CRS and the round trip time calculated by the first calculating unit, a position of the UE.

15. The apparatus according to claim 14, wherein:

when the difference between the receiving time and the sending time on the UE is calculated, a path of the uplink reference signal sent by the UE and selected to participate in the calculation and a path of the cell reference signal received by the UE and selected to participate in the calculation are uplink-downlink symmetric; and when the difference between the receiving time and the sending time on the base station is calculated, a path of the uplink reference signal received by the base station and selected to participate in the calculation and a path of the cell reference signal sent by the base station and selected to participate in the calculation are uplink-downlink symmetric;

wherein the path of the uplink reference signal sent by the UE is consistent with the path of the uplink reference signal received by the base station; and the path of the cell reference signal received by the UE is consistent with the path of the cell reference signal sent by the base station.

16. The apparatus according to claim 14, the modules further including:
a second receiving unit, configured to, when a frequency used when the base station does not send the CRS to the UE through an intermediate node is different from a frequency used when the base station sends the CRS to the UE through an intermediate node, or when an intermediate node that forwards the CRS does not forward the CRS to the UE at a same frequency, receive signaling that comprises information of an available frequency and is sent by the UE, wherein the available frequency is calculated by the UE according to a reference signal received power at the received frequency; and
an instructing unit, configured to instruct the UE to receive, by using the available frequency, the CRS sent by the base station.

17. The apparatus for positioning a user equipment according to claim 14, the modules further including:
a third receiving unit, configured to, when a frequency used when the base station does not send the CRS to the UE through an intermediate node is different from a frequency used when the base station sends the CRS to the UE through an intermediate node, or when an intermediate node that forwards the CRS does not forward the CRS to the UE at a same frequency, receive a device index number carried by the CRS and sent by the UE, wherein the device index number is obtained by the UE by parsing first information carried by the CRS, wherein the first information is frequency information carried by the CRS and time information carried by the CRS, or the first information is frequency information carried by the CRS and a feature sequence carried by the CRS, or the first information is frequency information carried by the CRS, a feature sequence carried by the CRS, and time information carried by the CRS; and
a second determining unit, configured to determine, according to the device index number carried by the CRS, the base station or the intermediate node that sends the CRS.

18. The apparatus according to claim 14, the modules further including:
a fourth receiving unit, configured to when a frequency used when the base station does not send the CRS to the UE through an intermediate node is the same as a frequency used when the base station sends the CRS to the UE through an intermediate node, or when an intermediate node that forwards the CRS forwards the CRS to the UE at a same frequency, receive a device index number carried by the CRS and sent by the UE, wherein the device index number carried by the CRS is obtained by the UE by parsing second information carried by the CRS, wherein the second information is time information carried by the CRS, or the information is a feature sequence carried by the CRS, or the information is time information carried by the CRS and a feature sequence carried by the CRS; and
a third determining unit, configured to determine, according to the device index number carried by the CRS, the base station or the intermediate node that sends the CRS.

19. An apparatus for positioning a user equipment (UE), the apparatus comprising a computer including a non-transitory computer-readable medium storing program modules executable by the computer, the modules including:
a first receiving unit, configured to separately receive positioning configuration information sent by at least two base stations, wherein the positioning configuration information comprises a device index number of an intermediate node which belongs to a base station and which sends the positioning configuration information, position coordinates of the intermediate node, and a positioning reference signal (PRS) configuration information, wherein the PRS configuration information comprises PRS configuration information from the base station and/or PRS configuration information from the intermediate node belonging to the base station;
a third receiving unit, configured to receive first signaling when a frequency used when the base station does not send the PRS to a user equipment (UE) through an intermediate node is different from a frequency used when the base station sends the PRS to the UE through an intermediate node, or when an intermediate node that forwards the CRS does not forward the PRS to the UE at a same frequency, the first signaling having information of an available frequency and is sent by the UE, wherein the available frequency is calculated by the UE according to a reference signal received power at the received frequency;
a first calculating unit, configured to send the positioning configuration information received by the first receiving unit to the UE to instruct the UE to receive, according to the PRS configuration information, a PRS sent by the base station or the intermediate node to the UE, and to calculate, according to arrival time of the PRS, a reference signal time difference (RSTD);
an instructing unit, configured to, in response to receiving the first signaling, instruct the UE to receive the PRS that is sent by the base station or the intermediate node by using the available frequency;
a second receiving unit, configured to receive the RSTD sent by the UE; and
a first determining unit, configured to determine, according to the RSTD received by the second receiving unit and the position coordinates of the base station or the intermediate node that sends the PRS, a position of the UE.

20. The apparatus for positioning a user equipment according to claim 19, the modules further including:
a first sending unit, configured to, when a frequency used when the base station does not send the PRS to the UE through an intermediate node is different from a frequency used when the base station sends the PRS to the UE through an intermediate node, or when an intermediate node that forwards the PRS does not forward the PRS to the UE at a same frequency, send configuration information of at least two PRSs to the UE, so that the UE receives the at least two PRSs according to the configuration information of the at least two PRSs and obtains, by parsing third information carried by each of the at least two PRSs, a device index number carried by each of the at least two PRSs, wherein the third information is a feature sequence carried by each of the at least two PRSs and frequency information carried by each of the at least two PRSs, or the third information is sending time information carried by each of the at least two PRSs and frequency information carried by each of the at least two PRSs, or the third information is sending time information carried by each of the at least two PRSs, frequency information carried by each of the at least two PRSs, and a feature sequence carried by each of the at least two PRSs;

a fourth receiving unit, configured to receive the device index number carried by each of the at least two PRSs and reported by the UE; and a second determining unit, configured to determine, according to the device index number carried by each of the at least two PRSs, the base station or the intermediate node that sends the at least two PRSs.

21. The apparatus for positioning a user equipment according to claim 19, the modules further including:

a second sending unit, configured to, when a frequency used when the base station does not send the PRS to the UE through an intermediate node is the same as a frequency used when the base station sends the PRS to the UE through an intermediate node, or when an intermediate node that forwards the PRS forwards the PRS to the UE at a same frequency, send configuration information of the at least two PRSs to the UE, so that the UE receives the at least two PRSs according to the configuration information of the at least two PRSs and obtains, by parsing fourth information carried by each of the at least two PRSs, a device index number carried by each of the at least two PRSs, wherein the fourth information is time information carried by each of the at least two PRSs, or the fourth information is a feature sequence carried by each of the at least two PRSs, or the fourth information is time information carried by each of the at least two PRSs and a feature sequence carried by each of the at least two PRSs;

a fifth receiving unit, configured to receive the device index number carried by each of the at least two PRSs and reported by the UE; and a third determining unit, configured to determine, according to the device index number carried by each of the at least two PRSs, the base station or the intermediate node that sends the at least two PRSs.

* * * * *